US010466777B2

(12) United States Patent
Liu

(10) Patent No.: US 10,466,777 B2
(45) Date of Patent: Nov. 5, 2019

(54) PRIVATE REAL-TIME COMMUNICATION BETWEEN MEETING ATTENDEES DURING A MEETING USING ONE OR MORE AUGMENTED REALITY HEADSETS

(71) Applicant: GetGo, Inc., Fort Lauderdale, FL (US)

(72) Inventor: Mengqian Liu, Goleta, CA (US)

(73) Assignee: LogMeIn, Inc., Boston, MA (US)

( * ) Notice: Subject to any disclaimer, the term of this patent is extended or adjusted under 35 U.S.C. 154(b) by 429 days.

(21) Appl. No.: 15/371,337

(22) Filed: Dec. 7, 2016

(65) Prior Publication Data

US 2018/0157321 A1   Jun. 7, 2018

(51) Int. Cl.
*G06F 3/01* (2006.01)
*G06K 9/00* (2006.01)
(Continued)

(52) U.S. Cl.
CPC .......... *G06F 3/013* (2013.01); *G06F 3/04815* (2013.01); *G06F 3/04842* (2013.01); *G06K 9/00221* (2013.01); *G06K 9/00228* (2013.01); *G06K 9/00288* (2013.01); *H04L 12/1827* (2013.01); *H04L 51/00* (2013.01)

(58) Field of Classification Search
CPC ... H04L 51/00; H04L 65/403; H04L 12/1827; H04L 12/1822; H04L 12/1813; G06F 3/013; G06F 3/04842; G06F 3/04815; G02B 27/0093; G06K 9/00288; G06K 9/00671; G06K 9/00221; G06K 9/00268; H04N 7/157; H04N 7/15
See application file for complete search history.

(56) References Cited

U.S. PATENT DOCUMENTS 9,451,210 B1 *  9/2016  Smus ........................ H04N 7/15
9,613,448 B1 *  4/2017  Margolin ................ G06T 11/60
(Continued)

OTHER PUBLICATIONS

Colburn et al., The Role of Eye Gaze in Avatar Mediated Conversational Interfaces, Microsoft Research, Jul. 31, 2000 (Year: 2000).*
(Continued)

*Primary Examiner* — Nicholas Ulrich
(74) *Attorney, Agent, or Firm* — BainwoodHuang

(57) ABSTRACT

Private real-time communications are provided between meeting attendees during a meeting using one or more augmented reality headsets. An augmented reality headset worn by a sending meeting attendee continuously monitors a current direction of the sending meeting attendee's gaze during the meeting, and detects that the sending meeting attendee has selected a receiving meeting attendee when the current direction of the sending attendee's gaze intersects with a location of the receiving meeting attendee. The augmented reality headset worn by the sending meeting attendee also receives a messaging command issued by the sending meeting attendee, also based on monitoring the sending meeting attendee's gaze during the meeting. In response to the messaging command, the augmented reality headset worn by the sending meeting attendee automatically transmits the private message to a device associated with the receiving meeting attendee, such as an augmented reality headset worn by the receiving meeting attendee.

19 Claims, 13 Drawing Sheets

(51) Int. Cl.
*G06F 3/0484* (2013.01)
*G06F 3/0481* (2013.01)
*H04L 12/58* (2006.01)
*H04L 12/18* (2006.01)

(56) References Cited

U.S. PATENT DOCUMENTS

| | | | | |
|---|---|---|---|---|
| 2013/0304479 | A1* | 11/2013 | Teller | G06F 3/013 704/275 |
| 2014/0294257 | A1* | 10/2014 | Tussy | G06Q 10/00 382/118 |
| 2015/0215351 | A1* | 7/2015 | Barzuza | G06T 19/006 715/757 |
| 2016/0285793 | A1* | 9/2016 | Anderson | H04L 51/046 |
| 2018/0004283 | A1* | 1/2018 | Mathey-Owens | G06F 3/04815 |
| 2018/0034867 | A1* | 2/2018 | Zahn | G02B 27/0172 |

OTHER PUBLICATIONS

Azuma, Ronald T., "A Survey of Augmented Reality," In Presence: Teleoperators and Virtual Environments 6, 4 (Aug. 1997), 355-385, pp. 1-48.

Azuma, Ronald, et al, "Recent Advances in Augmented Reality," Computers & Graphics, Nov. 2001, pp. 1-15.

Bronstein, Alexander M., et al., "Three-Dimensional Face Recognition," Department of Computer Science, Technion—Israel Institute of Technology, Haifa 32000, Israel, first version May 18, 2004, second version Dec. 10, 2004, pp. 1-44.

Rolland, Jannick P. et al, "Development of Head-Mounted Projection Displays for Distributed, Collaborative, Augmented Reality Applications," Presence, vol. 14, No. 5, Oct. 2005, pp. 528-549.

Viola, Paul, et al, "Rapid Object Detection using a Boosted Cascade of Simple Features," Accepted Conference on Computer Vision and Pattern Recognition 2001, pp. 1-9.

Wong, Kwok-Wai, et al, "An efficient algorithm for human face detection and facial feature extraction under different conditions," Pattern Recognition 34 (2001), pp. 1993-2004.

Kaufmann, Hannes, "Collaborative Augmented Reality in Education", Institute of Software Technology and Interactive Systems, Vienna University of Technology, Mar. 2003, 5 pages.

* cited by examiner

PRIVATE REAL-TIME COMMUNICATION BETWEEN MEETING ATTENDEES DURING A MEETING USING ONE OR MORE AUGMENTED REALITY HEADSETS

TECHNICAL FIELD

The present disclosure relates generally to online meetings and/or video conferencing technology, and more specifically to techniques for providing private real-time communications between meeting attendees during a meeting using one or more augmented reality headsets.

BACKGROUND

In many meeting scenarios, meeting attendees desire to have private real-time communications during a meeting. For example, in a meeting between two teams of representatives, a member of one team may wish to communicate with another team member during the meeting with regard to the team's objectives or strategy, in view of developments occurring live during the meeting, without the communication being perceived by any member of the other team. In another example, during a presentation, an advisor to the presenter may wish to provide immediate feedback to the presenter during the presentation without interrupting the presentation and/or letting other attendees know that the feedback is being provided.

Using existing technologies to communicate with another meeting attendee during a meeting, a meeting attendee must access their laptop or mobile device (e.g. smartphone) to use either i) an online meeting application through which the meeting is being provided, or ii) a dedicated communication application (e.g. a text messaging service). When using existing online meeting applications, the attendee wishing to send the private message must use their laptop or mobile device to find the other attendee within a meeting attendee list, type in the message, and then enter a command that causes the message to be transmitted to the other attendee. When using a communication application such as a text messaging service, the attendee must use their laptop or smartphone to locate and select the other attendee within their contacts, or to manually type-in the other attendee's name or phone number, and then type in the message and enter a command causing the text message to be transmitted the other attendee.

SUMMARY

Unfortunately, previous technologies for providing communication between meeting attendees during a meeting have exhibited significant shortcomings. For example, accessing a laptop or mobile device during a meeting i) distracts the attendee from the information being shared during the meeting, and ii) is distracting to other meeting attendees. Accessing a laptop or mobile device is also likely to alert other meeting attendees that a communication is underway, thus compromising the privacy of the communication. Further, the list of meeting attendees that must be searched to identify another attendee may be long, and searching the list for the correct attendee to which the private message is to be sent may be tedious and time consuming, further distracting the attendee from the contents of the meeting, and making it even more likely that other attendees will notice that a communication is being performed. Additionally, manual selection of a receiving attendee from the meeting attendee list is error prone, and accidently selecting the wrong target attendee could result in private information being exposed. Moreover, some meeting attendees may not be logged in to the online meeting application, and accordingly may not be listed in an attendee list associated with the meeting, or even accessible through the online meeting application at all. Even after a message is correctly sent, the receiving attendee often will not see the message promptly, since they may be busy talking and/or otherwise participating in the meeting, and accordingly not paying attention to the screen of their laptop or mobile device. As a result, reading of the message may be delayed, or the message may be missed entirely until after the meeting is over. Another potential shortcoming in previous systems is that the received message may pop up within the receiving attendee's virtual desktop, and thus inadvertently be made visible to other attendees if the receiving attendee's virtual desktop is being shared during the meeting.

To address the above described and other shortcomings of previous systems, new techniques are disclosed herein for providing private real-time communications between meeting attendees during a meeting using one or more augmented reality headsets. In the disclosed techniques, an augmented reality headset worn by a sending meeting attendee continuously monitors the direction of the sending meeting attendee's gaze during the meeting, and automatically detects selection, by the sending meeting attendee, of at least one receiving meeting attendee from among the other meeting attendees. Detecting the selection of the receiving meeting attendee includes detecting that the direction of the sending attendee's gaze intersects with a location of the receiving meeting attendee. After detecting selection of the receiving meeting attendee by the sending meeting attendee, and also responsive to monitoring of the direction of the sending meeting attendee's gaze during the meeting, the augmented reality headset worn by the sending meeting attendee receives a messaging command issued by the sending meeting attendee. In response to receiving the messaging command, the augmented reality headset worn by the sending meeting attendee automatically transmits a private message selected by the sending meeting attendee to a device associated with the receiving meeting attendee.

In another aspect of the disclosed techniques, multiple facial images may be captured via the augmented reality headset worn by the sending meeting attendee, and a set of facial recognition operations may be performed to associate attendee identities and/or other meeting metadata with respective ones of the captured facial images. In a current view of the meeting provided to the sending meeting attendee by the augmented reality headset worn by the sending meeting attendee, the augmented reality headset worn by the sending meeting attendee then displays each attendee identity in close visual proximity to the associated one of the facial images.

In another aspect of the disclosed techniques, the set of facial recognition operations may be performed by i) calculating a three dimensional location of each one of the other meeting attendees, and ii) generating an invisible boundary box surrounding each one of the three dimensional locations of each one of the other meeting attendees. Detecting that the current direction of the sending meeting attendee's gaze intersects with the location of the receiving meeting attendee may then include detecting that the current direction of the sending meeting attendee's gaze intersects with the invisible boundary box that surrounds the three dimensional location of the receiving meeting attendee.

In another aspect of the disclosed techniques, receiving the messaging command issued by the sending meeting attendee to the augmented reality headset worn by the sending meeting attendee may include detecting, as the messaging command, by the augmented reality headset worn by the sending user and also responsive to monitoring the direction of the sending meeting attendee's gaze during the meeting, that the direction of the meeting attendee's gaze has continuously intersected with the location of the receiving meeting attendee for at least a predefined amount of time. Automatically transmitting the private message from the augmented reality headset worn by the sending meeting attendee to the device associated with the receiving meeting attendee may then include transmitting a default private message in response to detecting that the current direction of the sending meeting attendee's gaze has continuously intersected with the location of the receiving meeting attendee for at least the predefined amount of time.

In another aspect of the disclosed techniques, receiving the messaging command issued by the sending meeting attendee to the augmented reality headset worn by the sending meeting attendee may include i) displaying, to the sending meeting attendee by the augmented reality headset worn by the sending meeting attendee, within the current view of the meeting provided to the sending meeting attendee by the augmented reality headset worn by the sending meeting attendee, a list of predefined messages, and ii) detecting, responsive to monitoring the direction of the sending meeting attendee's gaze during the meeting, selection by the sending meeting attendee of a predefined message from within the list of predefined messages displayed by the augmented reality headset, by detecting that the direction of the sending meeting attendee's gaze has intersected with the predefined message displayed within the list of the predefined messages. Automatically transmitting the private message from the augmented reality headset worn by the sending meeting attendee to the device associated with the receiving meeting attendee may then include transmitting the predefined message selected by the sending meeting attendee from within the list of predefined messages to the device associated with the receiving meeting attendee.

In another aspect of the disclosed techniques, the device associated with the receiving meeting attendee may be an augmented reality headset worn by the receiving meeting attendee. The augmented reality headset worn by the receiving attendee may, in response to receipt of the private message, detect whether the sending meeting attendee is within a current view of the meeting provided to the receiving meeting attendee through the augmented reality headset worn by the receiving meeting attendee. In response to detecting that the sending meeting attendee is within the current view of the meeting provided to the receiving meeting attendee through the augmented reality headset worn by the receiving meeting attendee, the augmented reality headset worn by the receiving meeting attendee displays the private message in close visual proximity to the sending meeting attendee within the current view of the meeting provided to the receiving meeting attendee through the augmented reality headset worn by the receiving meeting attendee. In another example, in response to detecting that the sending meeting attendee is not within the current view of the meeting provided to the receiving meeting attendee through the augmented reality headset worn by the receiving meeting attendee, the augmented reality headset worn by the receiving meeting attendee may display the private message in a pop-up message user interface display object within the current view of the meeting provided to the receiving meeting attendee through the augmented reality headset worn by the receiving meeting attendee. The pop-up message may include both the private message and an identifier (e.g. name, username, electronic mail address, picture, etc.) of the sending meeting attendee.

In another aspect of the disclosed techniques, performing the set of facial recognition operations may include retrieving a network address of the device associated with the receiving meeting attendee, and automatically transmitting the private message from the augmented reality headset worn by the sending meeting attendee to the device associated with the receiving meeting attendee may include transmitting the private message to the network address of the device associated with the receiving meeting attendee, in order for the private message to be delivered to the device associated with the receiving meeting attendee.

In another aspect of the disclosed techniques, the augmented reality headset worn by the sending meeting attendee may display, within a current view of the meeting provided to the sending meeting attendee through the augmented reality headset worn by the sending meeting attendee, a user interface display object indicating a group of meeting attendees. Detecting selection of at least one receiving meeting attendee may then include detecting selection of the display object indicating the group of meeting attendees, e.g. by detecting that the direction of the sending attendee's gaze intersects with the display object indicating the group of meeting attendees, and transmitting the private message from the augmented reality headset worn by the sending meeting attendee to each of the devices associated with respective ones of the meeting attendees in the group of meeting attendees.

The disclosed techniques may be embodied to provide various advantages over previous systems. For example, the disclosed techniques enable a meeting attendee to send a private message to another meeting attendee without accessing his or her laptop or mobile device during the meeting to send the private message. As a result, neither the sending attendee nor the other attendees are distracted from the meeting by the sending attendee accessing his or her laptop or mobile device to send the message during the meeting. In another example, since accessing a laptop or mobile device is also likely to alert other meeting attendees that a communication is underway, the disclosed techniques improve the privacy of the communication. Also, the disclosed techniques eliminate the need to search through a potentially long of list of meeting attendees to find the correct receiving attendee, thus further reducing the amount of time during which the sending attendee is distracted from the meeting, the likelihood that other attendees will deduce that a communication is being performed. The disclosed techniques further advantageously eliminate the error prone process of manually selecting the receiving attendee from the meeting attendee list, and therefore reduce the likelihood of a mistaken manual selection causing the private message to be sent to the wrong attendee. In another example, the disclosed techniques may provide for selection of a receiving meeting attendee even from among meeting attendees that are not logged into the online meeting application, and who accordingly may not be listed in an attendee list associated with the meeting, and may not even be accessible at all through the online meeting application. The private message may be displayed in the view of the meeting provided to the receiving meeting attendee by the augmented reality headset worn by the receiving attendee, causing the private message to be conveniently and reliably seen promptly by the receiving attendee, even while the receiving meeting attendee is actively participating in the meeting. Receipt of the private message is therefore not delayed or prevented simply because the receiving attendee is not currently paying attention to their laptop or mobile device. The disclosed techniques may accordingly prevent delays in the receiving attendee reading the private message. Further in the case where the private message is displayed by the augmented reality headset worn by the receiving attendee, i.e. within the view of the meeting providing to the receiving meeting attendee, the disclosed techniques avoid the risk that the received message will inadvertently be made visible to other meeting attendees since it does not pop up within the receiving attendee's virtual desktop potentially when the receiving attendee's virtual desktop is being shared during the meeting.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that the embodiments below are provided only by way of example and to illustrate various features and principles of the invention, and that the invention itself is broader than the specific examples of embodiments disclosed herein.

In the techniques disclosed herein for providing private real-time communications between meeting attendees during a meeting using one or more augmented reality headsets, an augmented reality headset worn by a sending meeting attendee continuously monitors a current direction of the sending meeting attendee's gaze during the meeting, and automatically detects selection, by the sending meeting attendee, of at least one receiving meeting attendee from among the other meeting attendees. Detecting the selection of the receiving meeting attendee by the sending meeting attendee is accomplished by detecting that the current direction of the sending attendee's gaze intersects with a location of the receiving meeting attendee. After the augmented reality headset worn by the sending meeting attendee detects that the sending meeting attendee has selected the receiving meeting attendee, the augmented reality headset worn by the sending meeting attendee uses the current direction of the sending meeting attendee's gaze to receive a messaging command issued by the sending meeting attendee. In response to receiving the messaging command, the augmented reality headset worn by the sending meeting attendee automatically transmits a private message to a device associated with the selected receiving meeting attendee.

Figure 1:
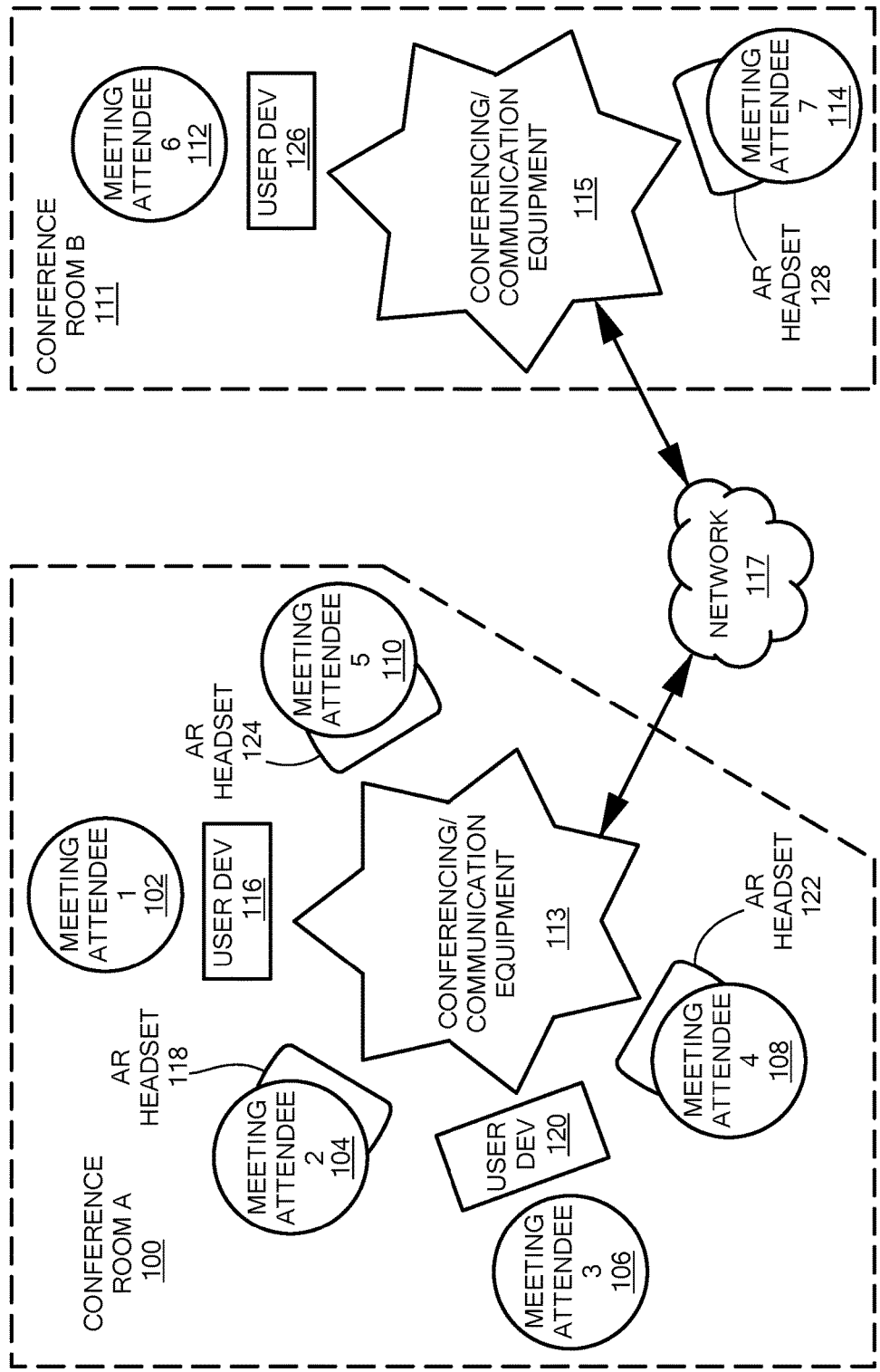
FIG. 1 is a block diagram illustrating an operational environment for a meeting being held across multiple locations, among multiple meeting attendees having associated devices, some of whom are wearing augmented reality headsets, and some of whom have other types of associated devices (e.g. laptops, smartphones, etc.), and further showing conferencing/communication equipment, and in which embodiments of the disclosed techniques may operate to provide private real time communications between meeting attendees.

FIG. 1 is a block diagram illustrating an example of an operational environment for embodiments of the disclosed techniques, in which a meeting is being held across multiple locations, and among multiple meeting attendees, some of whom are wearing augmented reality headsets, and some of whom have other types of associated devices (e.g. laptops, smartphones, etc.), and further showing conferencing/communication equipment operable to support an online meeting application and/or video conference involving both local and remote attendees.

Specifically, in the example of FIG. 1, a meeting is being held across two locations, e.g. Conference Room A 100 and Conference Room B 111. Meeting attendees participate in the meeting from both Conference Room A 100 and Conference Room B 111. Specifically, Meeting Attendee 1 102, Meeting Attendee 2 104, Meeting Attendee 3 106, Meeting Attendee 4 108 and Meeting Attendee 5 110 are physically located in Conference Room A 100, while Meeting Attendee 6 112 and Meeting Attendee 7 114 are physically located in Conference Room B 111. Conferencing/Communication Equipment 113 may include a large, shared display screen that displays video of meeting attendees who are located remotely from Conference Room A 100, e.g. video including the faces of Meeting Attendee 6 112 and Meeting Attendee 7 114, while Conferencing/Communication Equipment 115 may include a large, shared display screen that displays video of meeting attendees who are located remotely from Conference Room B 111, e.g. video including the faces of Meeting Attendee 1 102, Meeting Attendee 2 104, Meeting Attendee 3 106, Meeting Attendee 4 108 and Meeting Attendee 5 110. Conferencing/Communication Equipment 113 may include one or more cameras for capturing video of the meeting attendees physically located in Conference Room A 100, and Conferencing/Communication Equipment 115 may include one or more cameras for capturing video of the meeting attendees physically located in Conference Room B 111. Conferencing/Communication Equipment 113 may further include software and/or hardware operable to communicate, via Network 117, the video of the meeting attendees physically located in Conference Room A 100 to Conferencing/Communication Equipment 115, and Conferencing/Communication Equipment 115 may include software and/or hardware components operable to communicate, via Network 117, the video of the meeting attendees physically located in Conference Room B 111 to Conferencing/Communication Equipment 113.

Conferencing/Communication Equipment 113 may further include one or more microphones for capturing audio in Conference Room A 100, and Conferencing/Communication Equipment 115 may include one or more microphones for capturing audio in Conference Room B 111. Conferencing/Communication Equipment 113 may further include software and/or hardware operable to communicate, via Network 117, the audio from Conference Room A 100 to Conferencing/Communication Equipment 115, for output through one or more speakers in Conferencing/Communication Equipment 115, and Conferencing/Communication Equipment 115 may include software and/or hardware components operable to communicate, via Network 117, the audio from Conference Room B 111 to Conferencing/Communication Equipment 113, for output through one or more speakers in Conferencing/Communication Equipment 117.

Network 117 may consist of or include one or more communication networks, such as a local area network (LAN), and/or a wide area network (WAN) such as the Internet.

Further in the example of FIG. 1, each meeting attendee is shown with an associated device, such as an augmented reality headset, a laptop computer, a smartphone, or some other type of device that is operable to perform network communications and display of private messages. In this regard, Meeting Attendee 2 104 is shown wearing Augmented Reality Headset 118, Meeting Attendee 4 108 is shown wearing Augmented Reality Headset 122, Meeting Attendee 5 110 is shown wearing Augmented Reality Headset 124, and Meeting Attendee 7 114 is shown wearing Augmented Reality Headset 128. Each one of the augmented reality headsets is operable to i) provide its wearer with a view of the physical, real-world environment that is augmented by graphics and/or video that is generated and output by the headset, ii) capture video of the view provided to its wearer for processing by software and/or hardware logic within the headset, and iii) perform head-tracking (and in some embodiments eye tracking) so that a current direction of its wearer's gaze may be tracked, accessed and acted upon by software and/or hardware logic within the headset. Those skilled in the art will recognize that augmented reality headsets are also sometimes referred to as smart glasses, and/or mixed reality headsets.

As also shown in the example of FIG. 1, some meeting attendees have associated devices that are not augmented reality headsets. For example, Meeting Attendee 1 102 has an associated User Device 116 such as a laptop computer or smartphone, Meeting Attendee 3 106 has an associated User Device 120 such as a laptop computer or smartphone, and Meeting Attendee 6 112 has an associated User Device 126 such as a laptop computer or smartphone.

Conferencing/Communication Equipment 113 is further operable to provide network connectivity to each of the devices associated with the meeting attendees who are physically located in Conference Room A 100, and Conferencing/Communication Equipment 115 is further operable to provide network connectivity to each of the devices associated with the meeting attendees who are physically located in Conference Room B 111. For example, Conferencing/Communication Equipment 113 may include a wireless access point (WAP) that allows each one of the devices 116, 118, 120, and 122 associated with the meeting attendees located in Conference Room A 100 to connect via Wi-Fi to Network 117, and Conferencing/Communication Equipment 115 may include a wireless access point (WAP) that allows each one of the user devices 126 and 128 to connect to via Wi-Fi to Network 117.

Those skilled in the art will recognize that while Conferencing/Communication Equipment 113 and Conferencing/Communication Equipment 115 are shown in the example of FIG. 1 as being physically separate from the devices associated with the meeting attendees, the disclosed techniques are not limited to such an approach. Accordingly, equivalent conferencing and/or communication equipment for either Conference Room A 100 and/or Conference Room B 111 may alternatively be provided wholly or partly within one or more of the devices, e.g. augmented reality headsets, laptop computers, smartphones, etc., associated with one or more of the meeting attendees.

Those skilled in the art will also recognize that while each meeting attendee in FIG. 1 is shown with a single associated device, the disclosed techniques are not so limited, and alternatively one or more meeting attendees may have multiple associated devices, e.g. both an augmented reality headset and a laptop or smartphone.

During operation of an embodiment of the disclosed techniques in the operational environment shown in FIG. 1, private real-time communication is provided between meeting attendees during the meeting being held in Conference Room A 100 and Conference Room B 111. For example, Meeting Attendee 5 110 may use an embodiment of the disclosed techniques to send a private real-time message to Meeting Attendee 4 108. Meeting Attendee 5 110 may thus be an example of a sending meeting attendee, and Meeting Attendee 4 108 may be an example of a receiving meeting attendee. The augmented reality headset worn by the sending meeting attendee, in this case Augmented Reality Headset 124, continuously monitors the direction of the sending meeting attendee's gaze during the meeting, e.g. the current direction of the gaze of Meeting Attendee 5 110 during the meeting. By monitoring the direction of the sending meeting attendee's gaze, Augmented Reality Headset 124 automatically detects that the sending meeting attendee has selected the receiving meeting attendee from the other meeting attendees that are physically present in Conference Room A 100. For example, Augmented Reality Headset 124 may automatically detect that Meeting Attendee 5 110 has selected Meeting Attendee 4 108 as the receiving meeting attendee from among the meeting attendees in Conference Room A 100, in response to detecting that the current direction of Meeting Attendee 5 110's gaze intersects with the location of Meeting Attendee 4 108 in Conference Room A 100. After detecting that Meeting Attendee 5 110 has selected Meeting Attendee 4 108 as the receiving meeting attendee, and while continuing to monitor the direction of Meeting Attendee 5 100's gaze during the meeting, Augmented Reality Headset 124 receives a messaging command issued by the sending meeting attendee. In response to receiving the messaging command, Augmented Reality Headset 124 transmits a private message to a device associated with the receiving meeting attendee, for example to the Augmented Reality Headset 122 worn by Meeting Attendee 4 108.

The augmented reality headset worn by the sending meeting attendee, in this example Augmented Reality Headset 124 worn by Meeting Attendee 5 110, may capture facial images of the meeting attendees who are physically located in Conference Room A 100, in order to perform facial recognition operations. For example, Augmented Reality Headset 124 may detect, in one or more video frames captured via a video camera contained in Augmented Reality Headset 124, facial images of Meeting Attendee 1 102, Meeting Attendee 2 104, Meeting Attendee 3 106, and Meeting Attendee 4 108. Face detection may be provided in Augmented Reality Headset 124 using various conventional face detection technologies. Also, the remote attendees such as Attendee 6 112 and Attendee 7 144 can also be detected as long as they show up in the video displayed on the display screen in conferencing equipment 113.

Augmented Reality Headset 124 may then perform a set of facial recognition operations to associate an attendee identity with each one of the facial images captured via the augmented reality headset worn by the sending meeting attendee. For example, Augmented Reality Headset 124 may perform a facial recognition operation on each of the detected facial images by comparing the facial image detected in a video frame with a set of facial images of users that are known to be possible meeting attendees, e.g. facial images of meeting attendees in an attendee list for the meeting. As it is generally known, such comparisons may be performed by comparing a template of facial features extracted from the facial image detected in the video frame to facial feature templates of the known users. For example, a set of meeting metadata loaded into Augmented Reality Headset 124 prior to the meeting may include a meeting attendee list having a list entry for each meeting attendee that was invited to the meeting. The entry for a meeting attendee may include information such as the meeting attendee's name, a facial recognition template of facial features extracted from a pre-existing image of the meeting attendee, a pre-existing image of the meeting attendee, and/or a network address of a device associated with the meeting attendee. The Augmented Reality Headset 124 may generate a template of facial features for the facial image detected in the video frame, and compare the generated template to the facial recognition templates contained in the entries of the meeting attendee list until a match is found. The matching entry for a facial image detected in a video frame contains the name, facial recognition template, and pre-existing image of the corresponding meeting attendee, and the network address of the device associated with the meeting attendee corresponding to the facial image detected in the video frame. In this way the Augmented Reality Headset 124 may perform a set of facial recognition operations to associate meeting attendee metadata, including a meeting attendee identity, with each facial image of a meeting attendee that has been captured in a video frame received from a video camera contained in the augmented reality headset worn by the sending meeting attendee.

A practical way to perform face recognition is by separating face detection and recognition into two stages. The goal for the detection stage is tracking the existing faces in the scene. And the goal for face recognition stage is identifying whom the faces belong to. Since face detection without matching the detected face to a known face dataset is faster than face recognition, and requires less computation resources, face detection may be performed at a higher frequency while sending the detected faces to a recognition process that operates at a lower frequency. Because of the fact that in video conferences, attendees are not moving or changing a lot, this method is practical and efficient.

After a meeting attendee identity has been associated with each meeting attendee facial image detected in a video frame, the Augmented Reality Headset 124 may display each attendee identity associated with a facial image detected in the video frame in close visual proximity to the location of the corresponding meeting attendee within a current augmented reality view of the meeting provided to Meeting Attendee 5 110 by Augmented Reality Headset 124. In this way, the attendee identity for a meeting attendee may be displayed in close proximity to the location of the meeting attendee within the view of the meeting provided to the sending meeting attendee through the augmented reality headset worn by the sending meeting attendee.

For example, Augmented Reality Headset 124 may display, within the augmented reality view of the meeting provided to Meeting Attendee 5 110, the name of each meeting attendee next to the corresponding meeting attendee. In the example of FIG. 1, Augmented Reality Headset 124 would display the name of Meeting Attendee 1 102 next to Meeting Attendee 1 102, the name of Meeting Attendee 2 104 next to Meeting Attendee 2 104, the name of Meeting Attendee 3 106 next to Meeting Attendee 3 106, and the name of Meeting Attendee 4 108 next to Meeting Attendee 4 108.

Augmented Reality Headset 124 may, for example, perform the set of facial recognition operations for each meeting attendee other than Meeting Attendee 5 110 in Conference Room A 100, by i) calculating a three dimensional location of the corresponding meeting attendee, and ii) generating an invisible boundary box surrounding the three dimensional location of the corresponding meeting attendee. After the invisible boundary boxes have been generated for each of the meeting attendees other than Meeting Attendee 5 110, Augmented Reality Headset 124 may detect that the current direction of the Meeting Attendee 5 110's gaze intersects with the location of a receiving meeting attendee, in this case Meeting Attendee 4 108, by detecting that the current direction of Meeting Attendee 5 110's gaze intersects with the invisible boundary box that surrounds the three dimensional location of Meeting Attendee 4 108. In this way, for example, Augmented Reality Headset 124 may detect that Meeting Attendee 5 110 has selected Meeting Attendee 4 108 as the receiving meeting attendee.

After detecting the selection of Meeting Attendee 4 108 as the receiving meeting attendee by Meeting Attendee 5 110, Augmented Reality Headset 124 then receives a messaging command issued by Meeting Attendee 5 110. The specific messaging command received by Augmented Reality Headset 124 selects the specific contents of the private real-time message that is subsequently automatically transmitted to the device associated with the receiving meeting attendee (e.g. to Augmented Reality Headset 122) in response to receipt of the messaging command. For example, Augmented Reality Headset 124 may receive a messaging command indicating a default "tap on the shoulder" type of private real-time message by detecting that the direction of the Meeting Attendee 5 110's gaze has continuously intersected with the location of Meeting Attendee 4 108 for at least a predetermined period of time, e.g. two seconds. Such a predefined default private message may consist of or include a short predefined phrase or simple reminder, such as "hi!", "hello!", "remember our goals", or any other specific default private message. A specific default private message may be defined for a particular meeting prior to the meeting, and, for example, stored in the meeting metadata for that meeting. In this example, the messaging command consists of the sending meeting attendee maintaining their gaze on the receiving meeting attendee for at least the predetermined period of time.

In another example, in response to detecting that the sending meeting attendee, e.g. Meeting Attendee 5 110, has moved their gaze away from the selected receiving meeting attendee prior to expiration of the predetermined period of time, e.g. away from Meeting Attendee 4 108 prior to expiration of a two second time period, Augmented Reality Headset 124 may display a list of predefined private messages within the augmented reality view of the meeting provided to Meeting Attendee 5 110. Augmented Reality Headset 124 may then receive the messaging command issued by Meeting Attendee 5 110 by detecting selection, by Meeting Attendee 5 110, of one of the predefined private messages in the list of predefined private messages. For example, Augmented Reality Headset 124 may receive the messaging command by detecting that Meeting Attendee 5 100 has directed their gaze to one of the private messages within the list of predefined private messages, e.g. by detecting that the gaze of Meeting Attendee 5 100 intersects with one of the messages within the list of predefined messages. Augmented Reality Headset 124 may then automatically transmit the private message to the device associated with the receiving meeting attendee, e.g. to Augmented Reality Headset 122 worn by Meeting Attendee 4 108, by transmitting the predefined private message selected by Meeting Attendee 5 100 from within the list of predefined private messages to Augmented Reality Headset 122.

In the case where the device associated with the receiving meeting attendee is an augmented reality headset, e.g. in the case where Meeting Attendee 4 108 is the receiving meeting attendee and is wearing Augmented Reality Headset 122, the augmented reality headset worn by the receiving attendee receives the private message transmitted from the augmented reality headset worn by the sending meeting attendee (e.g. Augmented Reality Headset 124) and, in response to receipt of the private message, detects whether the sending meeting attendee is within a current view of the meeting provided through the augmented reality headset worn by the receiving meeting attendee. For example, in the case where the private message is received by the Augmented Reality Headset 122 worn by Meeting Attendee 4 108, Augmented Reality Headset 122 detects whether Meeting Attendee 5 110 is within the view of the meeting provided to Meeting Attendee 4 108 through Augmented Reality Headset 122. In response to detecting that Meeting Attendee 5 110 is within the current view of the meeting provided to Meeting Attendee 4 108 through Augmented Reality Headset 122, Augmented Reality Headset 122 displays the private message in close visual proximity to the sending meeting attendee, e.g. next to Meeting Attendee 5 110, in the current view of the meeting provided to Meeting Attendee 4 108 through Augmented Reality Headset 122 worn by Meeting Attendee 4 108. Alternatively, in response to detecting that the sending meeting attendee, e.g. Meeting Attendee 5 110, is not within the current view of the meeting provided to Meeting Attendee 4 108 through Augmented Reality Headset 122, Augmented Reality Headset 122 displays the private message in a pop-up message user interface display object within the current view of the meeting provided to Meeting Attendee 4 108 through Augmented Reality Headset 122. The pop-up message user interface display object may, for example, consist of or include both the private message and an identifier of the sending meeting attendee, e.g. the private message and the name or username of Meeting Attendee 5 110, and/or an image of Meeting Attendee 5 110. The name, username, and/or image of Meeting Attendee 5 110 may, for example, be obtained from an entry for Meeting Attendee 5 100 in an attendee list contained in meeting metadata retrieved by and stored in Augmented Reality Headset 122.

As part of or in response to the facial recognition operations performed by Augmented Reality Headset 124, Augmented Reality Headset 124 may also retrieve a network address of the device associated with the receiving meeting attendee, e.g. a network address of Augmented Reality Headset 122 worn by Meeting Attendee 4 108. Augmented Reality Headset 124 may then automatically transmit the private message to the Augmented Reality Headset 122 at least in part by transmitting the private message to the network address of the device associated with the receiving meeting attendee, e.g. to the network address of Augmented Reality Headset 122 worn by Meeting Attendee 4 108.

The augmented reality headset worn by the sending meeting attendee, e.g. Augmented Reality Headset 124 worn by Meeting Attendee 5 110, may enable the sending meeting attendee to indicate that the private message is to be transmitted to a group of meeting attendees. For example, Augmented Reality Headset 124 may display, within the current view of the meeting provided to Meeting Attendee 5 110 by Augmented Reality Headset 124, a group name user interface display object indicating a group of meeting attendees. Such a display object may, for example, be a group name indicating all members of a team of negotiators involved in a negotiation. The Augmented Reality Headset 124 may then detect selection of the receiving meeting attendee by detecting selection of the group name display object by Meeting Attendee 5 110, for example by detecting that the current direction of Meeting Attendee 5 110's gaze intersects with the displayed group name. In response to detecting selection of the displayed group name by Meeting Attendee 5 110, Augmented Reality Headset 124 automatically transmits the private message to each meeting attendee in the group of meeting attendees, e.g. by sending the private message to a device associated with each one of the meeting attendees in the group of meeting attendees.

FIGS. 2-6 illustrate an example of how the disclosed techniques may be built on an augmented reality platform, in which the user interface provided by the disclosed techniques is rendered on top of the real world. Advantageously, as shown in FIGS. 2-6, both the sending meeting attendee and the receiving meeting attendee may interact with the disclosed system while simultaneously paying attention to the meeting. The content displayed through the augmented reality headset worn by the sending meeting attendee is only visible to the sending meeting attendee, and the content displayed through the augmented reality headset worn by the receiving meeting attendee is only visible to the receiving meeting attendee. All such displayed content is accordingly kept completely private to the sending meeting attendee and receiving meeting attendee. Moreover, the process of private communication during a meeting is greatly simplified through the disclosed techniques, since the sending meeting attendee need only look at the receiving meeting attendee to select the receiving meeting attendee, and to cause a private message to be transmitted to the receiving meeting attendee.

As further shown in FIGS. 2-6, the user interface generated by the disclosed techniques is rendered by the augmented reality headsets as a transparent layer between user and the real world, with user interface display objects, such as a message icon, a list of predefined private messages, or a group name, rendered thereon. A cursor user interface display object is also generated that tracks the direction of the sending meeting attendee's gaze, in order to visually indicate to the sending meeting attendee the current direction of the sending meeting attendee's gaze, so that the sending meeting attendee can accurately and conveniently select either a user interface display object, or a meeting attendee, simply by adjusting their gaze.

Figure 2:
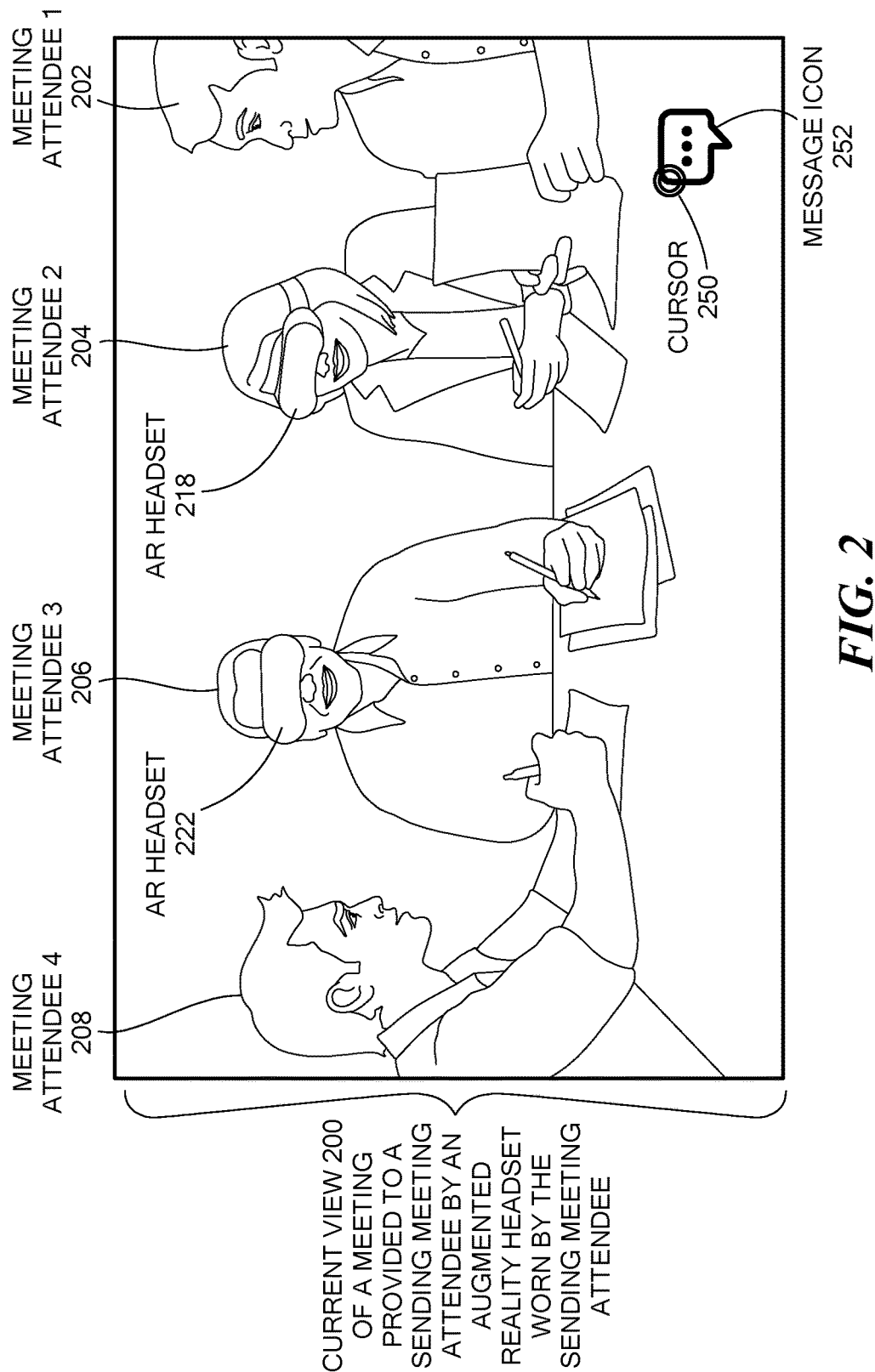
FIG. 2 shows a first example of a current view of a meeting provided to a sending meeting attendee through an augmented reality headset worn by the sending meeting attendee, including an example of a message icon user interface display object and a gaze tracking cursor generated by the augmented reality headset.

FIG. 2 shows an example of a Current View 200 of a meeting provided to a sending meeting attendee through an augmented reality headset worn by a sending meeting attendee. In Current View 200, several other meeting attendees are visible to the sending meeting attendee through the augmented reality headset worn by the sending meeting attendee, e.g. Meeting Attendee 1 202, Meeting Attendee 2 204, Meeting Attendee 3 206, and Meeting Attendee 4 208. Meeting Attendee 2 204 is wearing an Augmented Reality Headset 218, and Meeting Attendee 3 206 is wearing Augmented Reality Headset 222. The augmented reality headset worn by the sending meeting attendee also generates and displays a Cursor 250 that tracks the sending meeting attendee's gaze, e.g. based on head position tracking and/or eye ball tracking provided the augmented reality headset. The augmented reality headset worn by the sending meeting attendee also generates and displays a Message Icon 252, which is a user interface display object that may be selected to trigger one or more features of the disclosed techniques. In the example of FIG. 2, the sending meeting attendee has caused Cursor 250 to overlap with Message Icon 252 by adjusting their gaze towards Message Icon 252, thus triggering the disclosed system to subsequently receive a messaging command. Message Icon 252 and/or one or more other display objects in the user interface may, for example, be embodied as "tag-along" display objects that are continuously displayed within the view of the meeting provided by the augmented reality headset worn by the sending meeting attendee, e.g. around the outside of the view of the meeting provided by the augmented reality headset worn by the sending meeting attendee. In this way, a display object in the user interface may never fully leave the sending meeting attendee's view of the meeting. As the sending meeting attendee moves their head, the user interface display object stays within an easy glance by sliding towards the edge of the view of the meeting provided to the sending meeting attendee, without completely leaving the view of the meeting provided to the sending meeting attendee. When the sending meeting attendee gazes towards the tag-along user interface display object, it comes more fully into view and may be selected in response to the direction of the sending meeting attendee's gaze causing the cursor to overlap with the object. In this way, a user interface display object of the disclosed system, such as Message Icon 252, may be always accessible, without blocking the sight of the sending meeting attendee.

Figure 3:
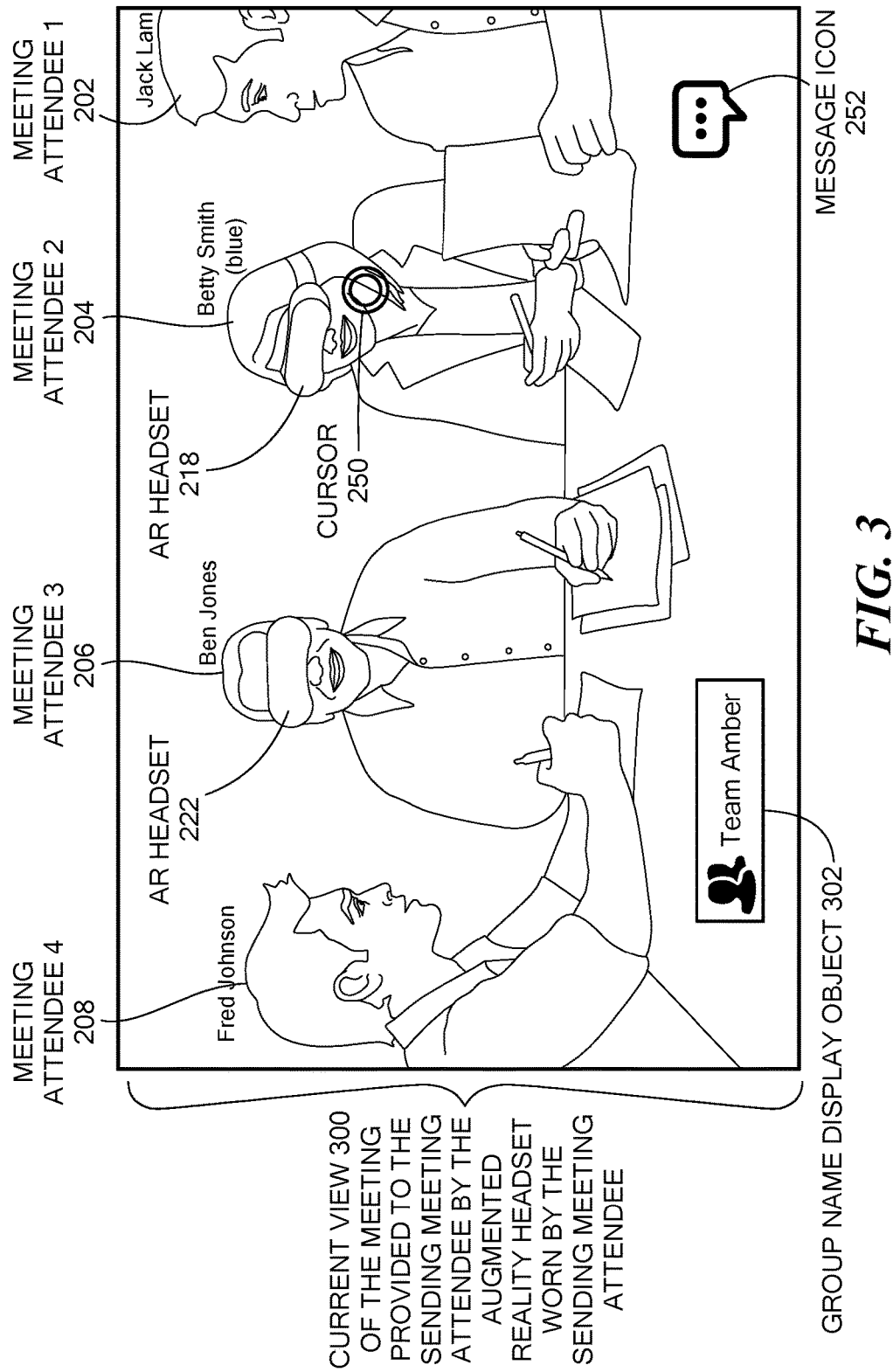
FIG. 3 shows a second example of a current view of a meeting provided to a sending meeting attendee through an augmented reality headset worn by the sending meeting attendee, including an example of attendee identities displayed in close visual proximity to the locations of associated meeting attendees.

FIG. 3 shows an example of a Current View 300 of the meeting provided to the sending meeting attendee through the augmented reality headset worn by the sending meeting attendee. In Current View 300, the augmented reality headset worn by the sending meeting attendee has responded to the sending meeting attendee causing Cursor 250 to overlap with Message Icon 252 in FIG. 2 by obtaining, generating and displaying attendee names next to the locations of each of the meeting attendees in the view of the meeting provided to the sending meeting attendee through the augmented reality headset worn by the sending meeting attendee. For example, as shown in FIG. 3, the augmented reality headset worn by the sending meeting attendee has displayed the name "Jack Lam" next to Meeting Attendee 1 202, the name "Betty Smith" next to Meeting Attendee 2 204, the name "Ben Jones" next to Meeting Attendee 3 206, and the name "Fred Johnson" next to Meeting Attendee 4 208. The augmented reality headset worn by the sending meeting attendee has also generated and displayed a Group Name Display Object 302, e.g. "Team Amber", which indicates a group of meeting attendees that may be selected to receive a private message.

As also shown in Current View 300, the augmented reality headset worn by the sending meeting attendee has detected that the sending meeting attendee has directed their gaze so that the Cursor 250 intersects with the location of Meeting Attendee 2 204, thus selecting Meeting Attendee 2 204 as the receiving meeting attendee. In addition, the augmented reality headset worn by the sending meeting attendee has responded to selection of Meeting Attendee 2 204 as the receiving meeting attendee by causing the name "Betty Smith" to be displayed in a visually distinct way, thus providing a visual indication that Meeting Attendee 2 204 has been selected as the receiving meeting attendee. For example, the augmented reality headset worn by the sending meeting attendee may cause the name "Betty Smith" to be displayed in a different color than is used to display the names of the other meeting attendees, e.g. in blue letters in the case where the names of the other meeting attendees are displayed in black letters.

In the case where the augmented reality headset worn by the sending meeting attendee subsequently detects, after detecting selection of Meeting Attendee 2 204 as the receiving meeting attendee by the sending meeting attendee, that the sending meeting attendee continues to look towards Meeting Attendee 2 204 for more than a predefined period of time, i.e. that the direction of the sending meeting's gaze continuously intersects with the location of Meeting Attendee 2 204 for more than a predefined period of time, thus causing the Cursor 250 to overlap with the location of Meeting Attendee 2 204 for more than the predefined period of time, the augmented reality headset worn by the sending meeting attendee automatically sends a default private message to the device associated with Meeting Attendee 2 204, e.g. to the Augmented Reality Headset 218 worn by Meeting Attendee 2 204. Such use of the default private message may, for example, be useful in a case where only a short, predefined message needs to be privately transmitted to the receiving meeting attendee, e.g. just to get the attention of the receiving meeting attendee.

Figure 4:
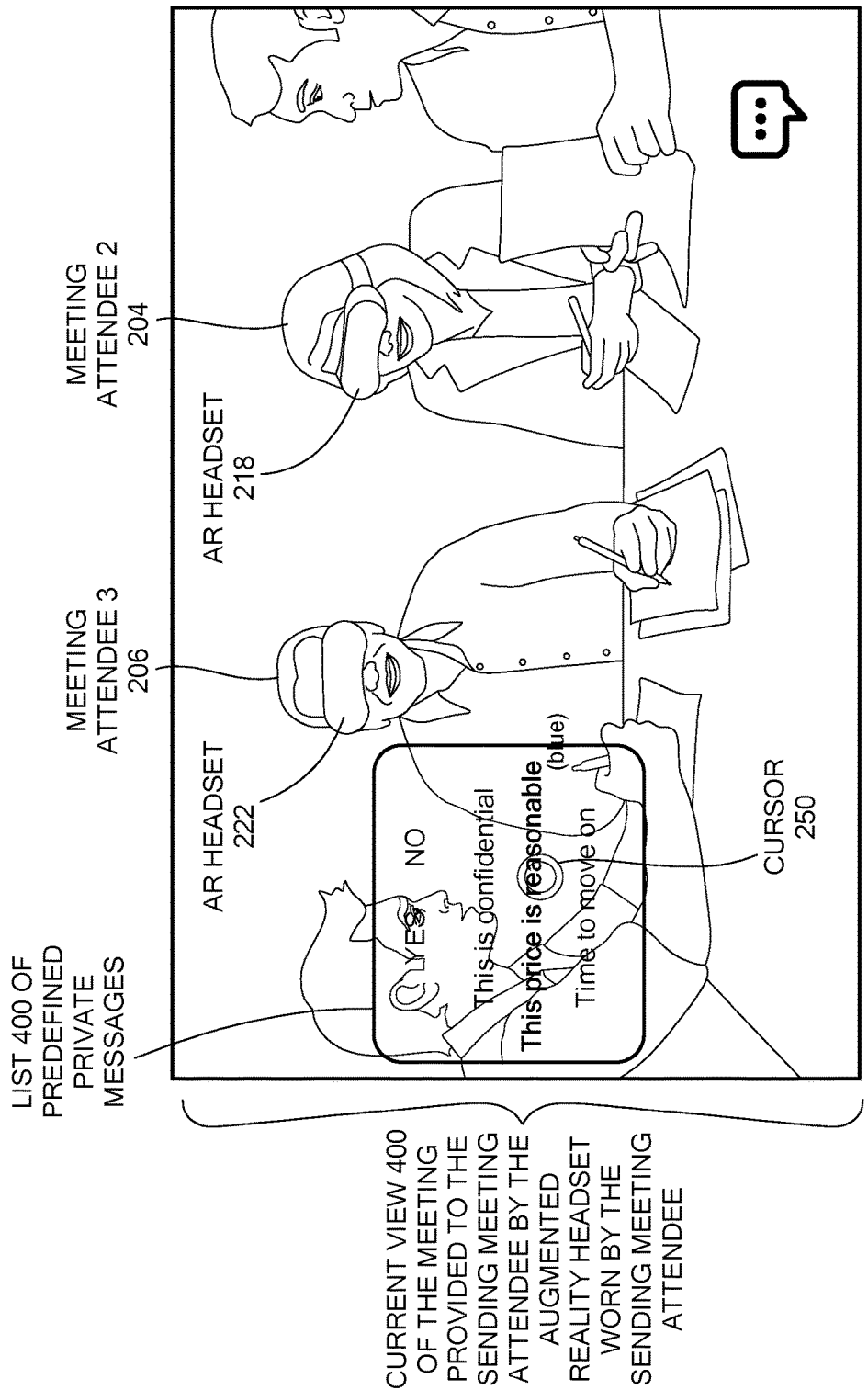
FIG. 4 shows a third example of a current view of a meeting provided to a sending meeting attendee by an augmented reality headset worn by the sending meeting attendee, including a list of predefined private messages from which the sending meeting attendee can select a predefined message to be transmitted to a device associated with the receiving meeting attendee.

FIG. 4 shows an example of a Current View 400 of the meeting provided to the sending meeting attendee through the augmented reality headset worn by the sending meeting attendee. In Current View 400, the augmented reality headset worn by the sending meeting attendee has detected that the sending meeting attendee looked away from the selected receiving meeting attendee prior to expiration of the predefined period of time, i.e. that the direction of the sending meeting attendee's gaze moved away from the location of Meeting Attendee 2 204 after selection of Meeting Attendee 2 204 as the receiving meeting attendee, causing the Cursor 250 to move away from the location of Meeting Attendee 2 204, prior to expiration of the predefined period of time. In response to detecting that the meeting attendee's gaze move away from Meeting Attendee 2 204 after selection of Meeting Attendee 2 204 and prior to expiration of the predefined period of time, the augmented reality headset worn by the sending meeting attendee generates and displays the List 400 of predefined private messages. Alternatively, List 400 of predefined private messages may be generated and displayed in response to detecting that the sending meeting attendee caused Cursor 250 to overlap with Message Icon 252, or in response to detecting that the sending meeting attendee has selected a receiving meeting attendee.

The List 400 may consist of a set of specific private messages that are predefined for a particular meeting, and that may be contained in and obtained from the metadata for each particular meeting. In the example of FIG. 4, the private messages contained in the List 400 are "Yes", "No", "This is confidential", "This price is reasonable", and "Time to move on". Further in the example of FIG. 4, the sending meeting attendee has adjusted their gaze such that the direction of their gaze intersects with the private message "This price is reasonable" within the List 400. As the location of Cursor 250 follows the gaze of the sending meeting attendee, Cursor 250 has moved to overlap with the private message "This price is reasonable". The private message "This price is reasonable" is thus selected from the List 400 as the private message to be automatically transmitted to the device associated with the receiving meeting attendee, i.e. to the Augmented Reality Headset 218 worn by Meeting Attendee 2 204.

Further in the example of FIG. 4, the augmented reality headset worn by the sending meeting attendee has caused the private message "This price is reasonable" to be displayed in a visually distinct way that indicates the private message "This price is reasonable" has been selected as the private message to be transmitted to the device associated with the receiving meeting attendee. For example, the augmented reality headset worn by the sending meeting attendee may cause the private message "This price is reasonable" to be displayed in a different color than is used to display the other private messages in the List 400, e.g. in blue letters in the case where the other private messages in the List 400 are displayed in black letters.

Figure 5:
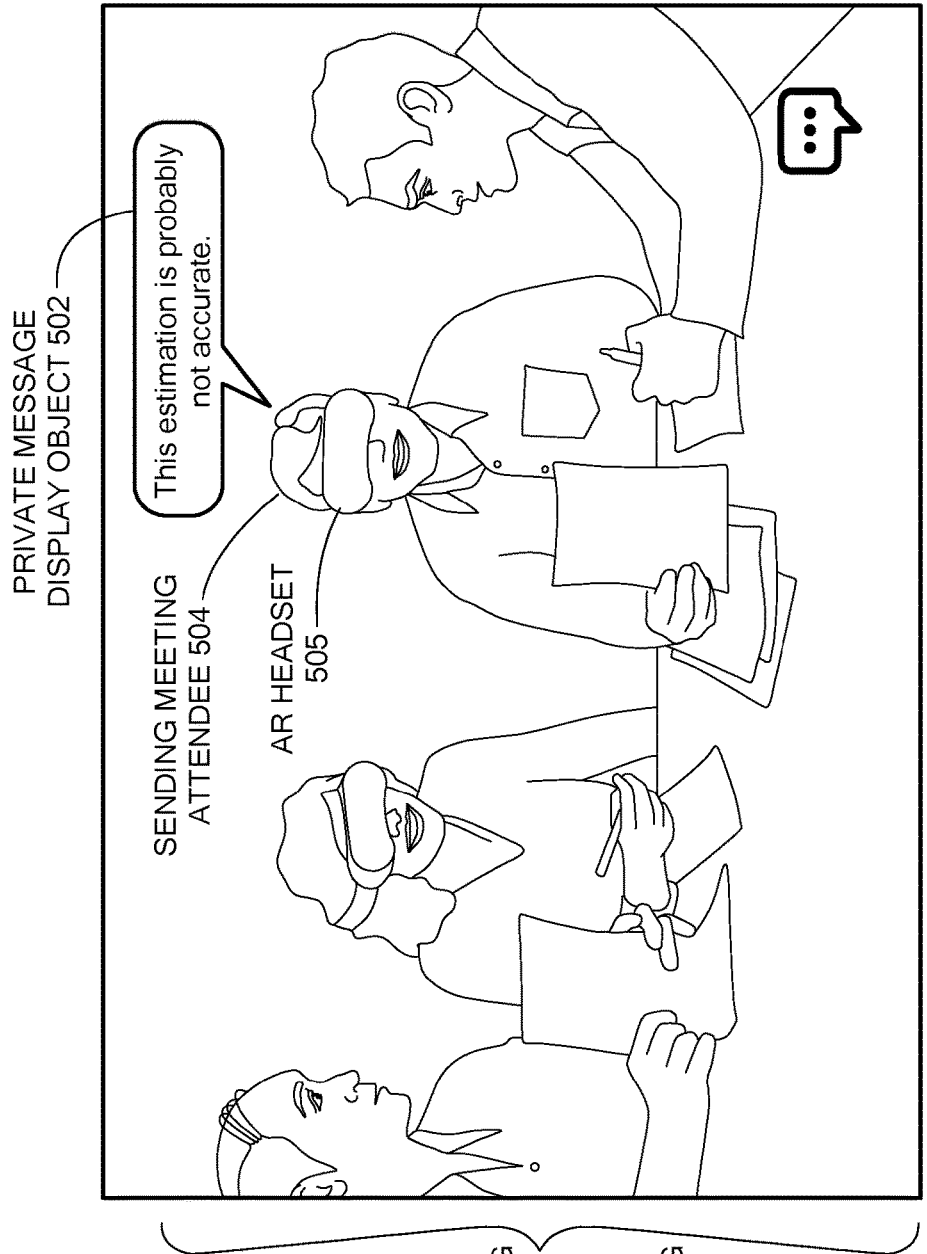
FIG. 5 shows an example of a current view of a meeting provided to a receiving meeting attendee through an augmented reality headset, including a received private message displayed in close visual proximity to the location of the sending meeting attendee in the current view of the meeting provided to the receiving meeting attendee.

FIG. 5 shows a Current View 500 of a meeting provided to a receiving meeting attendee through an augmented reality headset worn by the receiving meeting attendee. In the example of FIG. 5, the augmented reality headset worn by the receiving meeting attendee has received the private message "This estimation is probably not accurate" sent by Sending Meeting Attendee 504, i.e. as a private message transmitted from Augmented Reality Headset 505 worn by Sending Meeting Attendee 504 to the augmented reality headset worn by the receiving meeting attendee. In response to receipt of the private message, the augmented reality headset worn by the receiving meeting attendee detects whether the sending meeting attendee is visible within the Current View 500 of the meeting provided to the receiving meeting attendee through the augmented reality headset worn by the receiving meeting attendee. In the example of FIG. 5, the augmented reality headset worn by the receiving meeting attendee detects that Sending Meeting Attendee 504 is visible within the Current View 500 of the meeting provided to the receiving meeting attendee by the augmented reality headset worn by the receiving meeting attendee. In response to detecting that Sending Meeting Attendee 504 is visible within the Current View 500 of the meeting provided to the receiving meeting attendee by the augmented reality headset worn by the receiving meeting attendee, the augmented reality headset worn by the receiving meeting attendee displays the received private message in Private Message Display Object 502, such that Private Message Display Object 502 is displayed in close visual proximity to Sending Meeting Attendee 504, e.g. above or next to Sending Meeting Attendee 504, thus simultaneously bringing the private message immediately to the attention of the receiving meeting attendee, and visually indicating the sending meeting attendee that send the private message, e.g. Sending Meeting Attendee 504, to the receiving meeting attendee.

Figure 6:
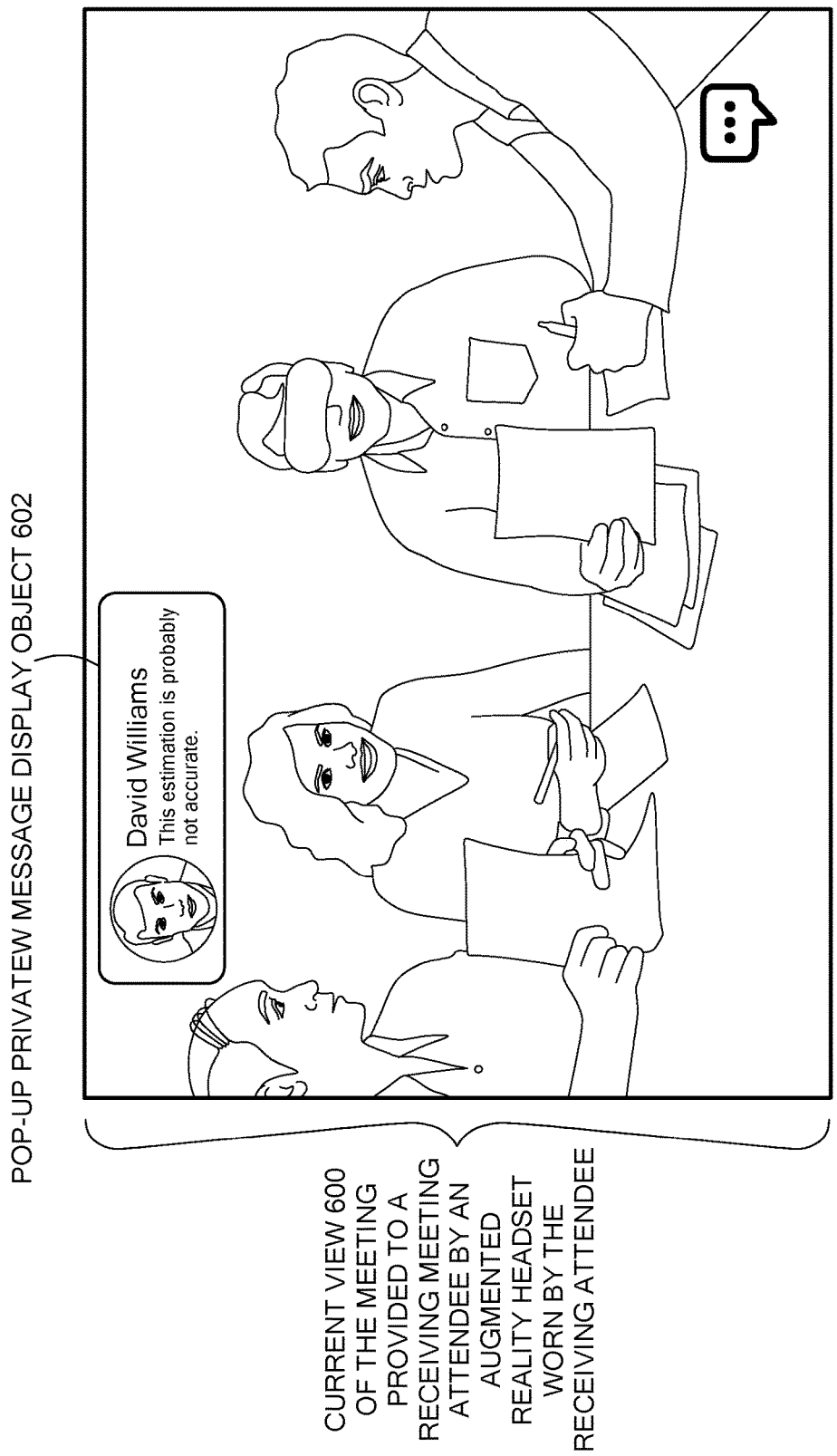
FIG. 6 shows an example of a current view of a meeting provided to a receiving meeting attendee through an augmented reality headset, including a received private message displayed in a pop-up message user interface display object within the current view of the meeting provided to the receiving meeting attendee.

FIG. 6 shows a Current View 600 of a meeting provided to a receiving meeting attendee through an augmented reality headset worn by the receiving meeting attendee. In the example of FIG. 6, the augmented reality headset worn by the receiving meeting attendee has received the private message "This estimation is probably not accurate." sent by a sending meeting attendee with the name "David Williams", i.e. a private message transmitted from an augmented reality headset worn by a sending meeting attendee with the name "David Williams". In response to receipt of the private message, the augmented reality headset worn by the receiving meeting attendee detects whether the sending meeting attendee is visible within the Current View 600 of the meeting provided to the receiving meeting attendee through the augmented reality headset worn by the receiving meeting attendee. In the example of FIG. 6, the augmented reality headset worn by the receiving meeting attendee detects that the meeting attendee "David Williams" is not visible within the Current View 600 of the meeting provided to the receiving meeting attendee by the augmented reality headset worn by the receiving meeting attendee. In response to detecting that "David Williams" is not visible within the Current View 600 of the meeting provided to the receiving meeting attendee by the augmented reality headset worn by the receiving meeting attendee, the augmented reality headset worn by the receiving meeting attendee displays the received private message in a Pop-Up Private Message Display Object 602. In the example of FIG. 6, Pop-Up Private Message Display Object 602 includes the private message "This estimation is probably not accurate", as well as the name of the sending meeting attendee (e.g. "David Williams"), and an image of the sending meeting attendee, thus simultaneously bringing the private message immediately to the attention of the receiving meeting attendee, and indicating the identity of the sending meeting attendee, e.g. "David Williams", to the receiving meeting attendee, even when the sending meeting attendee is not currently within the view of the meeting provided to the receiving meeting attendee.

Figure 7:
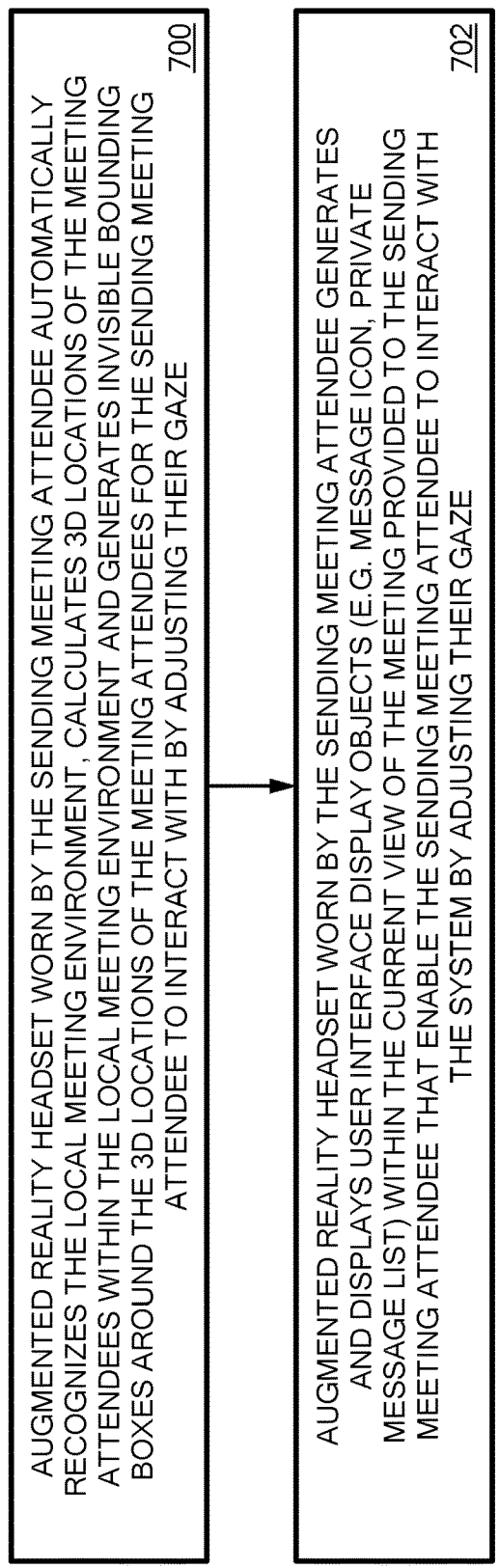
FIG. 7 is a flow chart showing an example of steps performed during operation of an embodiment of the disclosed system to recognize a local meeting environment, calculate three dimensional locations of the meeting attendees and generate surrounding bounding boxes for the three dimensional locations of the meeting attendees, and to generate and display user interface display objects for the sending meeting attendee to interact with by adjusting the direction of their gaze.

FIG. 7 is a flow chart showing an example of steps performed during operation of an embodiment of the disclosed system to recognize a local meeting environment, calculate three dimensional locations of the meeting attendees, and to generate and display user interface display objects for the sending meeting attendee to interact with by adjusting the direction of their gaze. In the example of FIG. 7, at step 700 an augmented reality headset worn by the sending meeting attendee automatically recognizes a local meeting environment and calculates three dimensional locations of the meeting attendees within the local meeting environment. Further at step 700 invisible boundary boxes may be generated surrounding each of the three dimensional locations of the meeting attendees. At step 702 the augmented reality headset worn by the sending meeting attendee generates user interface display objects (e.g. a message icon, private message list, etc.) within the current view of the meeting provided to the sending meeting attendee. The invisible boundary boxes surrounding three dimensional locations of the meeting attendees, and the user interface display objects generated and displayed by the augmented reality headset worn by the sending meeting attendee, may be stored as part of a polygonal mesh generated by the augmented reality headset to represent the real world of the meeting, and enable the sending meeting attendee to interact with the disclosed system by adjusting their gaze.

Figure 8:
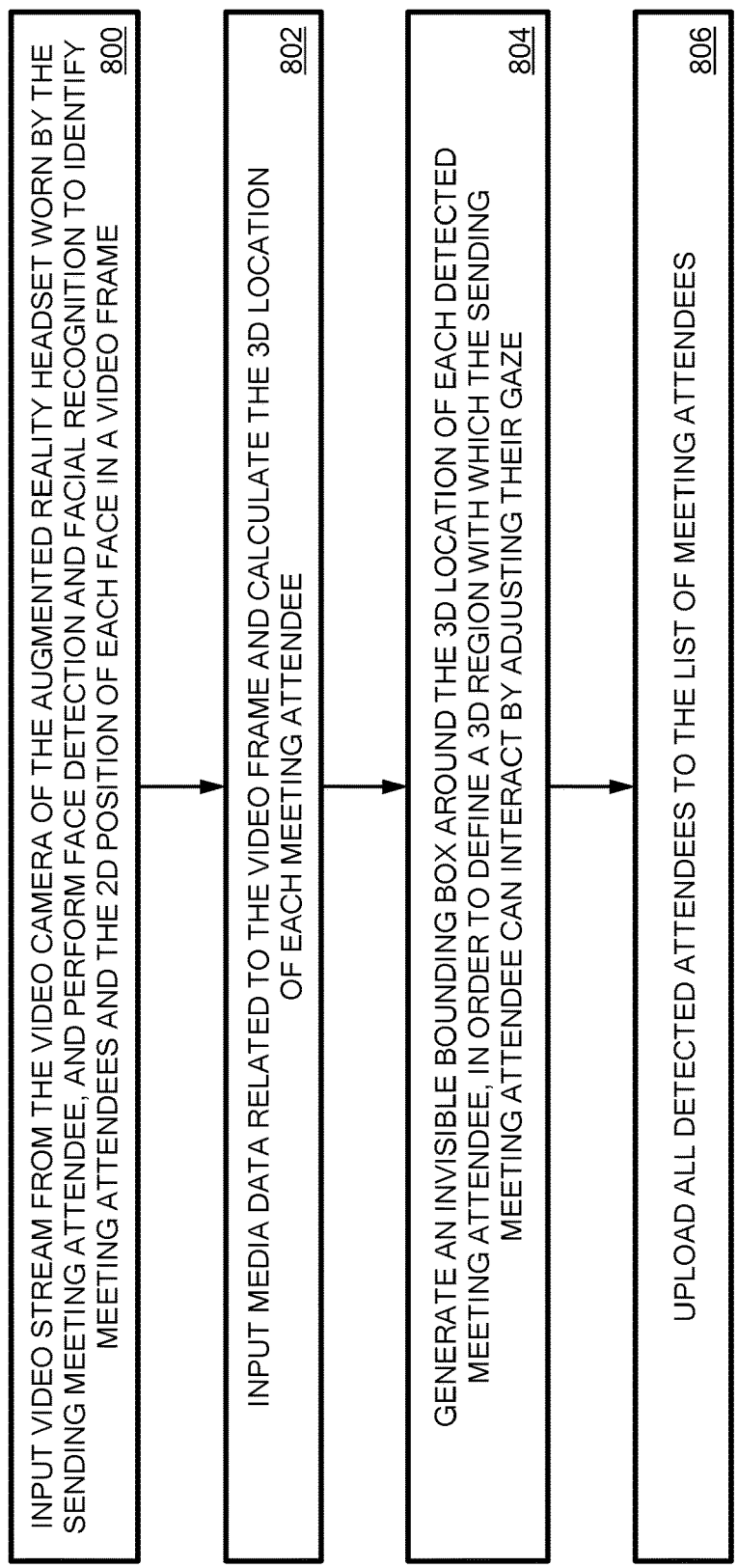
FIG. 8 is a flow chart showing an example of steps performed during operation of an embodiment of the disclosed system to recognize a local meeting environment and generate invisible bounding boxes around three dimensional locations of meeting attendees.

FIG. 8 is a flow chart showing an example of steps performed during operation of an embodiment of the disclosed system to recognize a local meeting environment, including the real world of the meeting and the meeting attendees, and to generate invisible bounding boxes around locations of meeting attendees, with which the sending meeting attendee can interact, e.g. when selecting a receiving meeting attendee by causing the cursor to overlap with a specific one of the bounding boxes. The steps shown in FIG. 8 are an example of how step 700 of FIG. 7 may be embodied.

At step 800, a video stream of video frames is input from a video camera of the augmented reality headset worn by the sending meeting attendee. For example, at the start of a meeting, each augmented reality headset worn by a meeting attendee may instruct (e.g. by way of an audible or visual prompt) it's wearer to visually scan the meeting room, so that a video stream of the local meeting environment, containing facial images of all meeting attendees, can be captured, including facial images of both locally present meeting attendees and remote meeting attendees whose facial images are displayed on a local display screen. Further at step 800, the augmented reality headset worn by the sending meeting attendee performs face detection and facial recognition operations to identify all meeting attendees. For each facial image detected in a video frame, the augmented reality headset generates the two dimensional position of the facial image in the video frame. The two dimensional position of the detected facial image in the video frame is passed with the video frame to spatial imaging logic in the augmented reality headset worn by the sending meeting attendee.

At step 802, the spatial imaging logic in the augmented reality headset worn by the sending meeting attendee inputs each video frame and two dimensional location of the facial image detected in the video frame. The spatial imaging logic also inputs sensor metadata for each video frame, e.g. sensor data from sensors in the augmented reality headset indicating a three dimensional position and orientation of the video camera in the augmented reality headset at the time the frame was captured, typically referred to as the "pose" of the video camera. For each video frame, the spatial imaging logic uses the two dimensional position of the facial image in the video frame, the video frame, and the three dimensional position and orientation of the video camera at the time the frame was captured to calculate a three dimensional location of a corresponding meeting attendee that was identified for the facial image detected in the video frame.

At step 804, the augmented reality headset worn by the sending meeting attendee generates and stores an invisible bounding box surrounding the three dimensional location of each detected meeting attendee. The invisible bounding box generated for each meeting attendee defines a three dimensional region with which the sending meeting attendee can interact by adjusting their gaze, e.g. by moving the cursor such that it overlaps with a bounding box for a specific meeting attendee in order to select that meeting attendee as a receiving meeting attendee. Each generated boundary box may be stored as part of a polygonal mesh that also represents the real world of the meeting and user interface display objects.

At step 806, the augmented reality headset worn by the sending meeting attendee may upload the identities of all detected attendees to the list of meeting attendees, thus providing an indication of all listed meeting attendees that in fact are present in the meeting. In addition, in the case where a meeting attendee is present but not represented by an entry in the list of meeting attendees, the augmented reality headset may find an identity for the meeting attendee from data external to the list of meeting attendees list (e.g. from a company directory or database, from a list of attendees for a different meeting, etc.), and then add the identity of the meeting attendee to the list of meeting attendees, so that the list of meeting attendees contains identities for not just meeting attendees that were invited, but for all meeting attendees that are present.

Figure 9:
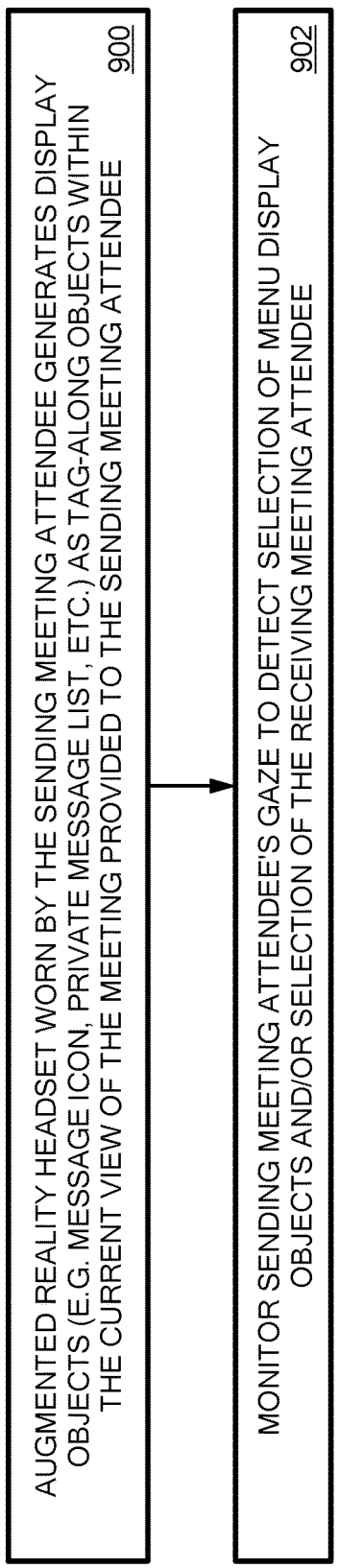
FIG. 9 is a flow chart showing an example of steps performed during operation of an embodiment of the disclosed system to monitor the sending meeting attendee's gaze to detect selection of user interface display objects generated by the augmented reality head set worn by a sending meeting attendee and a receiving meeting attendee based on the direction of the sending meeting attendee's gaze.

FIG. 9 is a flow chart showing an example of steps performed during operation of an embodiment of the disclosed system to generate and detect selection of user interface display objects generated by the augmented reality head set worn by a sending meeting attendee, based on the direction of the sending meeting attendee's gaze. At step 900, the augmented reality headset worn by the sending meeting attendee generates one or more user interface display objects (e.g. message icon, private message list, etc.), within the current view of the meeting provided to the sending meeting attendee. At step 902, the augmented reality headset worn by the sending meeting attendee monitors the sending meeting attendee's gaze to detect selection of one of the generated display objects, e.g. by detecting that the direction of the sending meeting attendee's gaze intersects with a specific user interface display object. Further at step 902, the augmented reality headset worn by the sending meeting attendee detects selection of the receiving meeting attendee by detecting that the direction of the sending meeting attendee's gaze intersects with a bounding box surrounding the three dimensional location of a meeting attendee.

Figure 10:
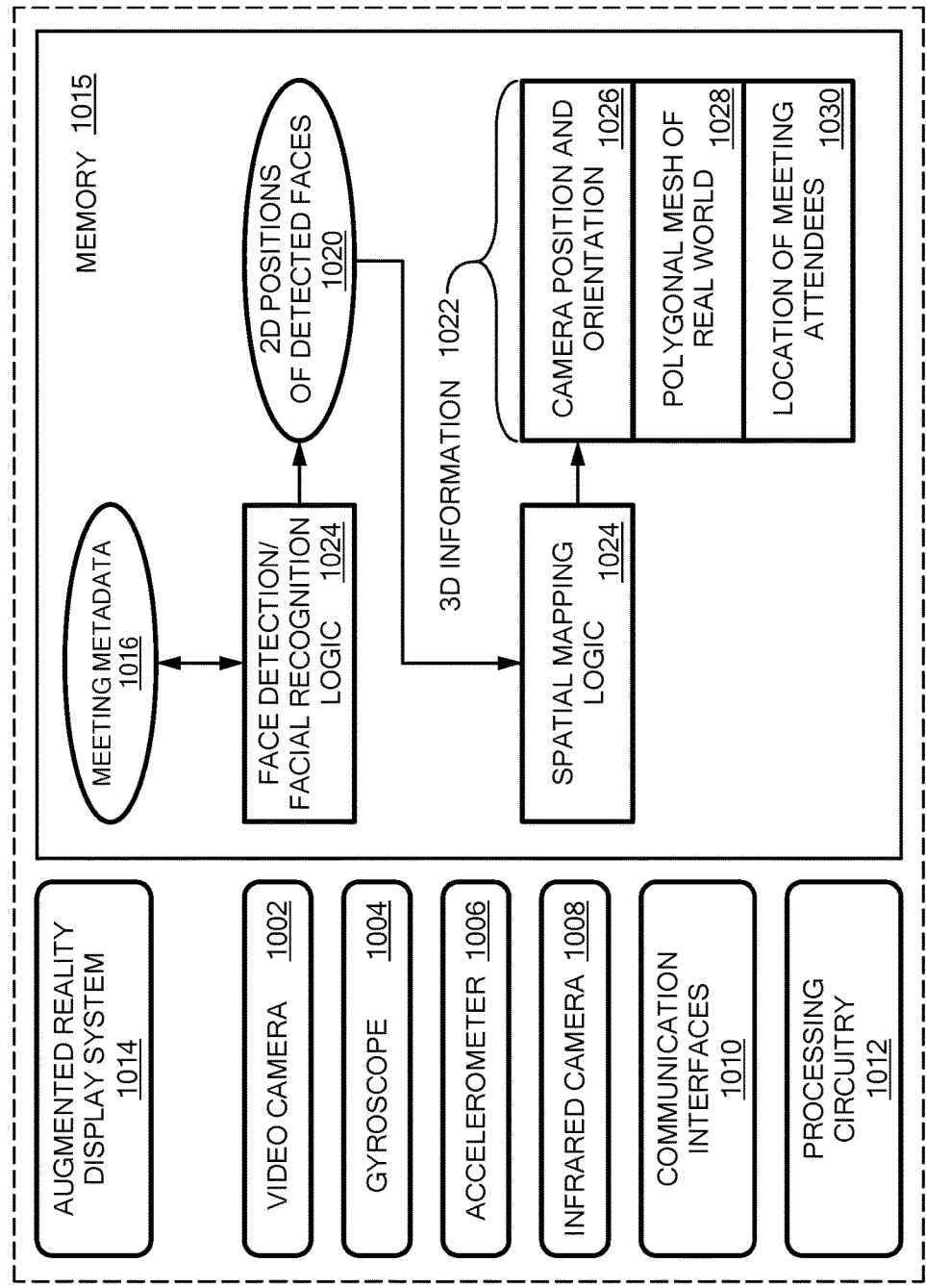
FIG. 10 is a block diagram showing an example of components in an augmented reality headset that are operable to recognize a local meeting environment, including the locations of a plurality of meeting attendees.
Figure 11:
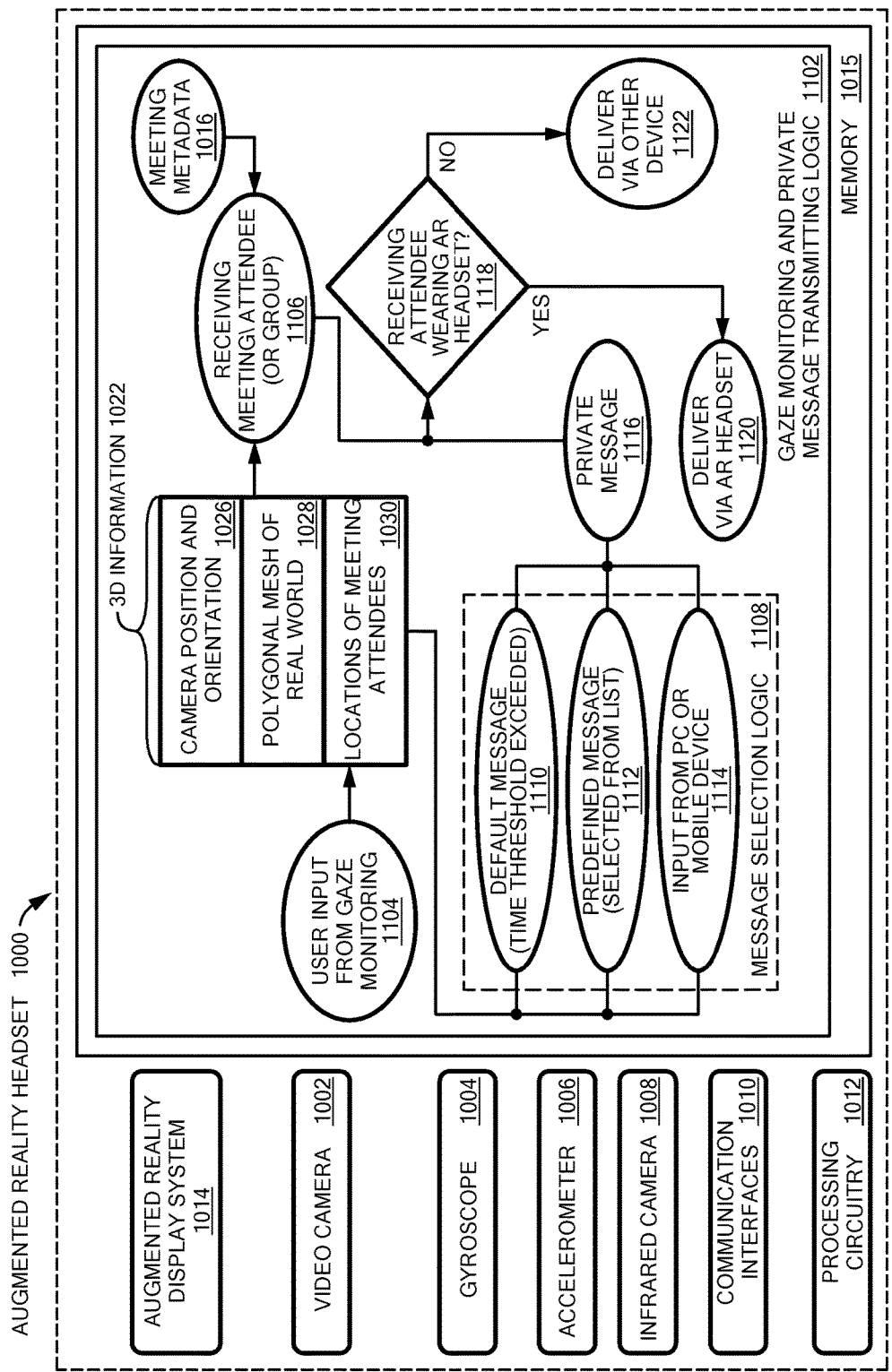
FIG. 11 is a block diagram showing an example of components in an augmented reality headset that are operable to transmit a private message from an augmented reality headset worn by a sending meeting attendee to a device associated with a receiving meeting attendee who was selected by the sending meeting attendee.
Figure 12:
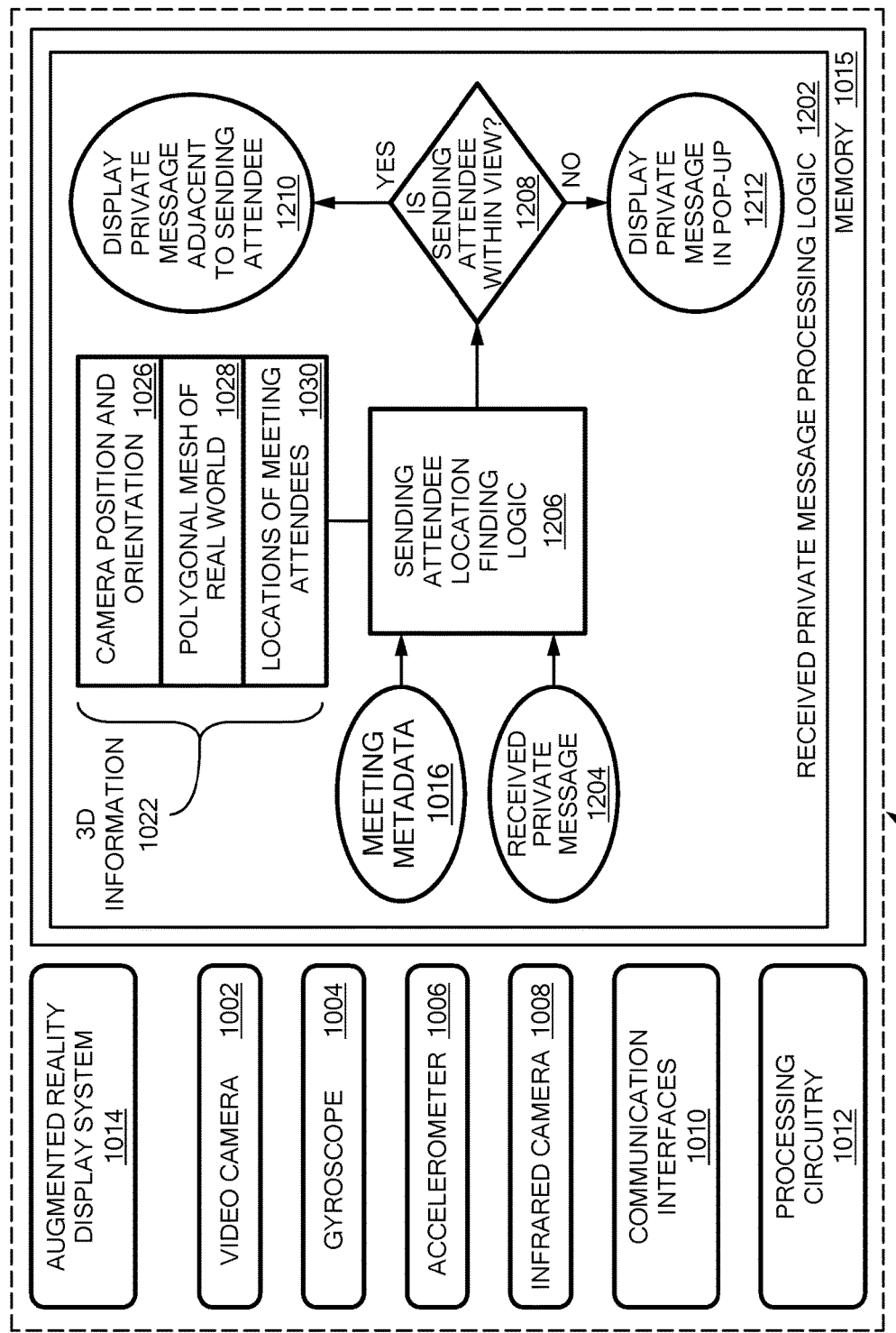
FIG. 12 is a block diagram showing an example of components in an augmented reality headset that are operable to receive a private message and display the received private message to the receiving meeting attendee.

FIGS. 10-12 show examples of components in an Augmented Reality Headset 1000 that may embody specific aspects of the disclosed techniques. The Augmented Reality Headset 1000 includes a transparent see-through display which is able to render computer-generated graphics on top of the real world, shown for purposes of illustration by Augmented Reality Display System 1014. Augmented Reality Display System 1014 may be embodied using various technologies that provide augmented reality rendering, such as an optical projection system for projecting display objects generated by Augmented Reality Headset 1000 onto a lens through which the wearer views the real world together with the overlaid display objects. Augmented Reality Headset 1000 is further equipped with multiple sensors, e.g. Video Camera 1002, Gyroscope 1004, Accelerometer 1006, and depth-sensing Infrared Camera 1008. Other components may also be present in the Augmented Reality Headset 1000, such as a magnetometer, a microphone and spatial sound reproduction components. The multiple sensors in the Augmented Reality Headset 1000 provide the ability to perform sensor fusion operations such as spatial mapping and head position tracking, enabling the wearer of Augmented Reality Headset 100 to interact with the disclosed system by adjusting their gaze. Augmented Reality Headset 1000 further includes Communication Interfaces 1010 which may include one or more network interfaces that enable the Augmented Reality Headset 1000 to communicate over one or more computer networks (e.g. Wi-Fi, Bluetooth, or other network interfaces), Processing Circuitry 1012 that may include one or more microprocessors and related circuitry, and a Memory 1015, operable to store program code that is executable on Processing Circuitry 1012, together with associated data generated and/or used by such program code.

FIG. 10 is a block diagram showing an example of components in Augmented Reality Headset 1000 that are operable to recognize and store three dimensional information that represents a local meeting environment. As shown in the example of FIG. 10, Memory 1015 may store program code that is executable on the Processing Circuitry 1012, shown in FIG. 10 as including Face Detection/Facial Recognition Logic 1018 and Spatial Mapping Logic 1024. In one embodiment, at the start of a meeting, Augmented Reality Headset 1000 generates a message, either audible or visual, that instructs it's wearer to look around the meeting, so that it can scan the room to learn the local real world meeting environment, including the identities and three dimensional locations of the meeting attendees, by performing face detection and facial recognition with regard to both the local attendees that are present within the room, and also remote attendees whose faces are displayed on conferencing equipment in the room.

During operation of the components shown in FIG. 10, the Face Detection/Facial Recognition Logic 1018 receives a video stream from Video Camera 1002, an also receives Meeting Metadata 106, e.g. through Communication Interfaces 1010 from a meeting metadata database located externally to Augmented Reality Headset 1000. Meeting Metadata 106 may include a list of meeting attendees for a specific meeting, where each entry in the list corresponds to a meeting attendee and may include information such as an identity (e.g. name, user name etc.) of the attendee, a facial recognition template for the attendee, an image of the attendee, and a network address of a device associated with the corresponding attendee and through which private messages may be delivered to that attendee. Face Detection/Facial Recognition Logic 1018 continuously performs face detection on video frames received from the Video Camera 1002, in order to detect the presence of faces in the video frames, e.g. faces of either local meeting attendees or of remote attendees that are displayed on conferencing equipment within the local meeting room. Face Detection/Facial Recognition Logic 1018 further performs facial recognition operations with regard to the faces it detects, in order to associate meeting attendee metadata, e.g. meeting attendee identities, meeting attendee images, associated device network addresses, etc., with the detected faces. For example, Face Detection/Facial Recognition Logic 1018 may perform facial recognition operations on the faces detected in video frames received from the Video Camera 1002, by comparing facial recognition templates contained in the entries of a meeting attendee list from the Meeting Metadata 1016 to facial recognition templates generated from the faces it detects in video frames it receives from the Video Camera 1002. In this way Face Detection/Facial Recognition Logic 1018 determines identities and other metadata associated with the meeting attendees who are present in the meeting. For example, the meeting attendee identities may be displayed through Augmented Reality Display System 1014 in response to detecting that the wearer of Augmented Reality Headset 1000 has selected a message icon, such as the Message Icon 252 shown in FIG. 3, in order for the sending meeting attendee to see the identities of the other meeting attendees when selecting the receiving meeting attendee for a private message.

Face Detection/Facial Recognition Logic 1018 generates and outputs Two Dimensional Positions 1020 of the faces detected in video frames received from Video Camera 1002. Two Dimensional Positions 1020 are passed to Spatial Mapping Logic 1024.

In addition to the Two Dimensional Positions 1020 received from Face Detection/Facial Recognition Logic 1018, Spatial Mapping Logic 1024 receives sensor data from the Video Camera 1002, Gyroscope 1004, Accelerometer 1006, and Infrared Camera 1008. For each frame of video received from Video Camera 1002, Spatial Mapping Logic 1024 uses the sensor data it receives from the Gyroscope 1004, Accelerometer 1006 and/or Infrared Camera 1008 to calculate a three dimensional position/orientation of Video Camera 1002, shown by Camera Position 1026. Once the Camera Position 1026 is calculated, Spatial Mapping Logic 1024 performs a transformation from pixels in the video frame to an application-specific coordinate system based on the camera projection matrix of the Video Camera 1002. As is generally known to those skilled in the art, a conventional camera projection matrix may be used in this regard, consisting of a 3×4 matrix generally describing the mapping of a pinhole camera model from three dimensional points in the real world to two dimensional points in an image, in this case the video frame.

The application-specific coordinate system is used to obtain a one-dimensional ray from the Video Camera 1002 to a face detected in a frame. Spatial Mapping Logic 1024 then determines the distance along the ray from Video Camera 1002 to the detected face. Spatial Mapping Logic 1024 may be embodied to use any one of the following three techniques to determine the distance from Video Camera 1002 to a detected face:

1. Use a predetermined estimated actual size of the detected face (e.g. based on a typical actual size of a human face) as a known computation factor with the conventional camera projection matrix to estimate of the distance from the Video Camera 1002 to the detected face in the video frame, based on the size of the face within the video frame.

2. Use spatial mapping data received from one or more of the sensors in Augmented Reality Headset 1000, such as from the depth-sensing Infrared Camera 1008, and indicating where the ray "hit" the real object that is the detected face. The depth of this intersection point is the distance of the detected face from the Video Camera 1002.

3. Use triangulation, by estimating the distance of the face based on video frames from multiple perspectives. In this approach, Spatial Mapping Logic 1024 obtains multiple rays to the face using multiple video frames in which the same face was detected, and computes their approximate intersection point, which is the three dimensional location of the detected face.

Spatial Mapping Logic 1024 may then generate an invisible bounding box around each of the detected faces, in order to define a three dimensional region for each meeting attendee that the sending meeting attendee can interact with by adjusting the direction of their gaze, e.g. in order to select the receiving meeting attendee.

The Three Dimensional Information 1022 generated by Spatial Mapping Logic 1024 also stores a Polygonal Mesh 1028. Polygonal Mesh 1028 describes the real world of the local meeting environment, together with the user interface display objects generated by Augmented Reality Headset 1000 using the disclosed techniques, and the invisible bounding boxes that surround the three dimensional locations of the meeting attendees. Those skilled in the art will recognize that Polygonal Mesh 1028 may generally be embodied as a collection of vertices, edges and faces that defines the shape the real world of the local meeting room, together with the user interface display objects that are overlaid on top of the real world of the local meeting room by Augmented Reality Headset 1000, and also including the invisible bounding boxes surrounding the three dimensional locations of the meeting attendees. Various specific types of mesh may be used. For example, faces of Polygonal Mesh 1028 may consist of triangles (as in a triangle mesh), quadrilaterals, or other simple convex polygons, as may be appropriate for various specific embodiments.

FIG. 11 is a block diagram showing an example of components in an augmented reality headset that are operable to transmit a private message from an augmented reality headset worn by a sending meeting attendee to a device associated with a receiving meeting attendee who was selected by the sending meeting attendee. As shown in FIG. 11, Memory 1015 may further include Gaze Monitoring and Private Message Transmitting Logic 1102, which may be embodied as program code that is executable on Processing Circuitry 1012. When executed, Gaze Monitoring and Private Message Transmitting Logic 1102 receives the direction of the sending meeting attendee's gaze as User Input 1104. Gaze Monitoring and Private Message Transmitting Logic 1102 uses Three Dimensional Information 1022 to process User Input 1104, for example by way of Message Selection Logic 1108 receiving a messaging command that may be i) detecting that a predefined period of time has expired with the sending meeting attendee's gaze continuously intersecting with the location of the selected receiving meeting attendee, causing Message Selection Logic 1108 to set Private Message 1116 to a Default Message 1110, ii) detecting that the sending meeting attendee's gaze has intersected with a Predefined Message 1112 in a list of predefined private messages, causing Message Selection Logic 1108 to set Private Message 1116 to Predefined Message 1112, or iii) detecting that the sending meeting attendee has started entering the private message through a laptop computer or mobile device, causing Message Selection Logic 1108 to set Private Message 1116 to Input from PC or Mobile Device 1114.

Message Monitoring and Private Message Transmitting Logic 1102 further detects selection of one or more receiving meeting attendees in response to User Input 1104 and Three Dimensional Information 1022, shown by Receiving Meeting Attendee 1106. Based on Receiving Meeting Attendee 1106 and Meeting Metadata 1016, Gaze Monitoring and Private Message Transmitting Logic 112 performs a determination at 1118 as to whether the Receiving Meeting Attendee 1106 is wearing an augmented reality headset. For example, Meeting Metadata 1016 may include indications of whether each meeting attendee is wearing an augmented reality headset, i.e. whether the associated device for each meeting attendee is an augmented reality headset. If the determination of Gaze Monitoring and Private Message Transmitting Logic 1102 at 1118 is that the Receiving Meeting Attendee 1106 is wearing an augmented reality headset, then at 1120 Gaze Monitoring and Private Message Transmitting Logic 1102 transmits Private Message 1116 (e.g. through Communication Interfaces 1010) to the augmented reality headset worn by Receiving Meeting Attendee 1106. Alternatively, if the determination of Gaze Monitoring and Private Message Transmitting Logic 1102 at 1118 is that the Receiving Meeting Attendee 1106 is not wearing an augmented reality headset, then at 1122 Gaze Monitoring and Private Message Transmitting Logic 1102 transmits Private Message 1116 (e.g. through Communication Interfaces 1010) to another type of device associated with Receiving Meeting Attendee 1106. In the case where Private Message 1116 is transmitted at 1122 to a type of device other than an augmented reality headset, a delivery channel such SMS (Short Message Service) or electronic mail may be used to deliver Private Message 1116 to the device associated with Receiving Meeting Attendee 1106.

FIG. 12 is a block diagram showing an example of an augmented reality headset including components for receiving a private message and displaying the received private message to the receiving meeting attendee. As shown in FIG. 12, Memory 1015 may further include Received Private Message Processing Logic 1202, which may also be embodied as program code that is executable on Processing Circuitry 1012. In response to receipt of a private message, shown by Received Private Message 1204, and further responsive to Meeting Metadata 1016 and Three Dimensional Information 1014, Sending Attendee Location Finding Logic 1206 determines a location of the sending meeting attendee that sent the Received Private Message 1204. Received Private Message 1204 may include an identifier such as a name of the sending meeting attendee. Based on the location of the sending meeting attendee determined by Sending Attendee Location Finding Logic 1206, at 1208 Received Private Message Processing Logic 1202 determines whether the sending meeting attendee that sent Received Private Message 1204 is within the view of the meeting that is currently being provided through Augmented Reality Headset 1000 to a wearer of Augmented Reality Headset 1000. In the case where the sending meeting attendee that sent Received Private Message 1204 is within the view of the meeting that is currently being provided through Augmented Reality Headset 1000 to the wearer of Augmented Reality Headset 1000, at 1210 the Received Private Message Processing Logic 1202 displays the Received Private Message 1204 using Augmented Reality Display System 1014, and adjacent to the location of the sending meeting attendee within the view of the meeting that is currently being provided through Augmented Reality Headset 1000 to the wearer of Augmented Reality Headset 1000. Alternatively, in the case where the sending meeting attendee that sent Received Private Message 1204 is not within the view of the meeting that is currently being provided through Augmented Reality Headset 1000 to the wearer of Augmented Reality Headset 1000, at 1212 the Received Private Message Processing Logic 1202 displays the Received Private Message 1204, using Augmented Reality Display System 1014, in a pop-up display object that includes Received Private Message 1204, an identifier of the sending meeting attendee that sent Received Private Message 1204, and an image of the sending meeting attendee that sent Received Private Message 1204.

While Face Detection/Facial Recognition Logic 1018, Spatial Mapping Logic 1024, Gaze Monitoring and Private Message Transmitting Logic 1102, and Received Private Message Processing Logic 1202 are shown in and described above as program code executable on one or more processors within the augmented reality headset, the disclosed techniques are not limited to such an embodiment, and alternatively these components may be embodied wholly or partly in hardware circuitry.

Figure 13:
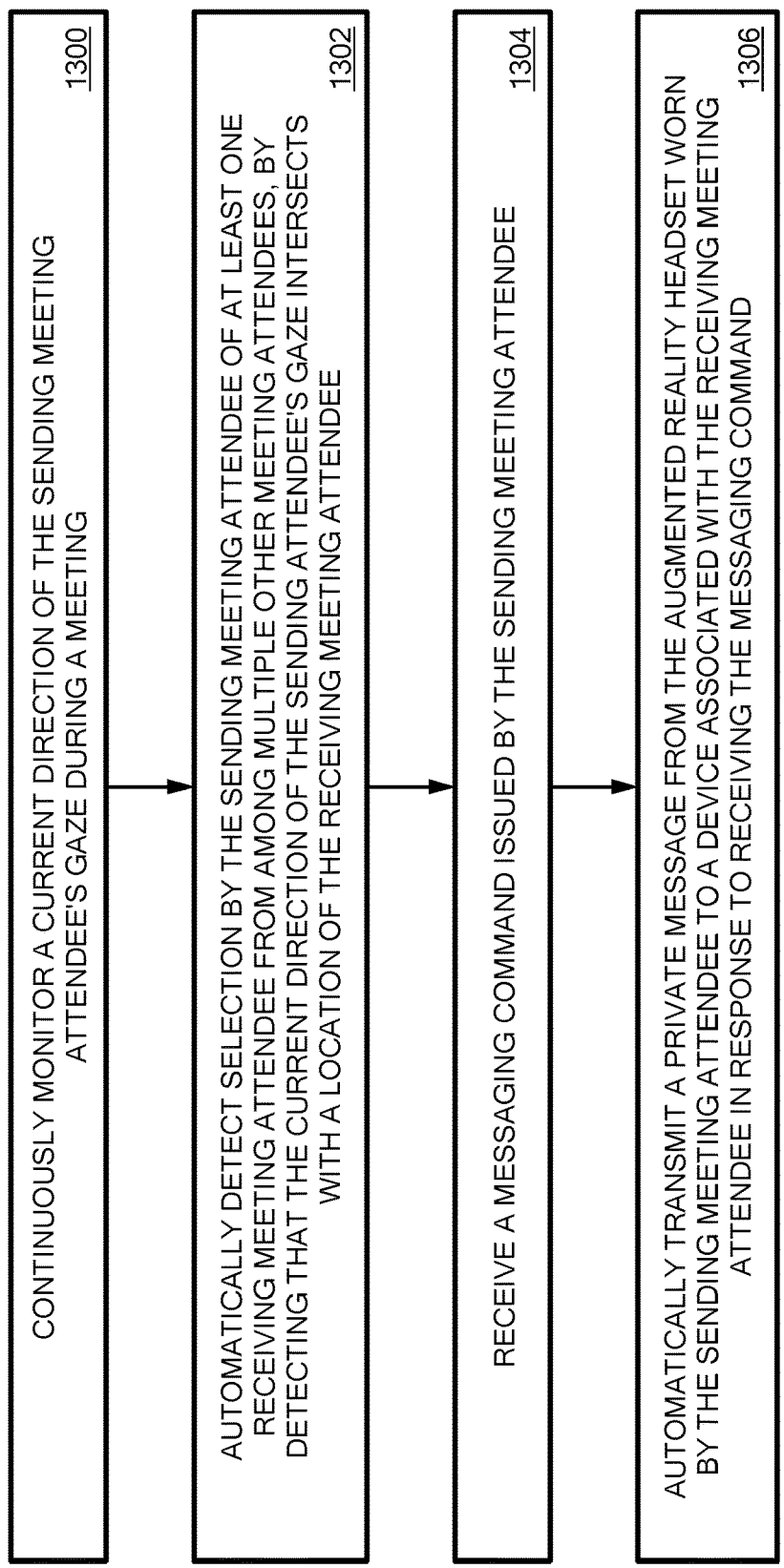
FIG. 13 is a flow chart showing an example of steps performed during operation of an embodiment of the disclosed techniques.

FIG. 13 is a flow chart showing an example of steps performed during operation of an embodiment of the disclosed techniques. As shown in FIG. 13, at step 1300 a current direction of a sending meeting attendee's gaze during a meeting is continuously monitored by an augmented reality headset worn by the sending meeting attendee. At step 1302, selection by the sending meeting attendee of at least one receiving meeting attendee from among multiple other meeting attendee's is automatically detected by the augmented reality headset detecting that the current direction of the sending meeting attendee's gaze intersects with a location of the receiving meeting attendee. At 1304, a messaging command issued by the sending meeting attendee is received by the augmented reality headset, and at 1306 the augmented reality headset automatically transmits the private message to a device associated with the receiving meeting attendee in response to receipt of the message command.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied at least in part in one or more non-transitory computer readable storage medium(s) having computer readable program code stored thereon for causing one or more processors and/or a computer system to carry out those aspects of the present disclosure.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing private real-time communications between meeting attendees during a meeting, the method comprising:
   in an augmented reality headset worn by a sending meeting attendee
      calculating a three dimensional location of each one of other meeting attendees,
      generating an invisible boundary box surrounding each one of the three dimensional locations of each one of the other meeting attendees,
      continuously monitoring a current direction of the sending meeting attendee's gaze during the meeting, automatically detecting, responsive to monitoring of the current direction of the sending meeting attendee's gaze during the meeting, selection of at least one receiving meeting attendee from a plurality of meeting attendees other than the sending meeting attendee, wherein detecting selection of the receiving meeting attendee includes detecting that the current direction of the sending attendee's gaze intersects with a location of the receiving meeting attendee, wherein detecting that the current direction of the sending meeting attendee's gaze intersects with the location of the receiving meeting attendee includes detecting that the current direction of the sending meeting attendee's gaze intersects with an invisible boundary box that surrounds the three dimensional location of the receiving meeting attendee, after detecting selection of the receiving meeting attendee, and also responsive to monitoring of the current direction of the sending meeting attendee's gaze during the meeting, receiving a messaging command issued by the sending meeting attendee, and automatically transmitting a private message from the augmented reality headset worn by the sending meeting attendee to a device associated with the receiving meeting attendee in response to receiving the messaging command.

2. The method claim 1, further comprising:

capturing a plurality of facial images via the augmented reality headset worn by the sending meeting attendee;

performing a set of facial recognition operations to associate an attendee identity with each one of the facial images captured via the augmented reality headset worn by the sending meeting attendee; and in a current view of the meeting provided to the sending meeting attendee by the augmented reality headset worn by the sending meeting attendee, displaying each one of the attendee identities in close visual proximity to the associated facial image.

3. The method of claim 1, wherein receiving the messaging command issued by the sending meeting attendee to the augmented reality headset worn by the sending meeting attendee includes detecting, as the messaging command, and also responsive to monitoring of the current direction of the sending meeting attendee's gaze during the meeting, that the direction of the meeting attendee's gaze has continuously intersected with the location of the receiving meeting attendee for at least a predefined amount of time; and wherein automatically transmitting the private message from the augmented reality headset worn by the sending meeting attendee to the device associated with the receiving meeting attendee includes transmitting a default private message in response to detecting that the direction of the sending meeting attendee's gaze has continuously intersected with the location of the receiving meeting attendee for at least the predefined amount of time.

4. The method of claim 2, wherein receiving the messaging command issued by the sending meeting attendee to the augmented reality headset worn by the sending meeting attendee includes i) displaying, to the sending meeting attendee by the augmented reality headset worn by the sending meeting attendee, within the current view of the meeting provided to the sending meeting attendee by the augmented reality headset worn by the sending meeting attendee, a list of predefined messages, and ii) detecting, responsive to monitoring the current direction of the sending meeting attendee's gaze during the meeting, selection by the sending meeting attendee of a predefined message from within the list of predefined messages, by detecting that the current direction of the sending meeting attendee's gaze has intersected with the predefined message displayed within the list of the predefined messages; and wherein automatically transmitting the private message from the augmented reality headset worn by the sending meeting attendee to the device associated with the receiving meeting attendee includes transmitting the predefined message selected by the sending meeting attendee from within the list of predefined messages to the device associated with the receiving meeting attendee.

5. The method of claim 4, wherein the device associated with the receiving meeting attendee comprises an augmented reality headset worn by the receiving meeting attendee, the method further comprising:

in the augmented reality headset worn by the receiving attendee responsive to receipt of the private message, detecting whether the sending meeting attendee is within a current view of the meeting provided to the receiving meeting attendee by the augmented reality headset worn by the receiving meeting attendee, and in response to detecting that the sending meeting attendee is within the current view of the meeting provided to the receiving meeting attendee by the augmented reality headset worn by the receiving meeting attendee, displaying the private message in close visual proximity to the sending meeting attendee within the current view of the meeting provided to the receiving meeting attendee by the augmented reality headset worn by the receiving meeting attendee.

6. The method of claim 4, wherein the device associated with the receiving meeting attendee comprises an augmented reality headset worn by the receiving meeting attendee, the method further comprising:

in the augmented reality headset worn by the receiving meeting attendee responsive to receipt of the private message, detecting whether the sending meeting attendee is within a current view of the meeting provided to the receiving meeting attendee by the augmented reality headset worn by the receiving meeting attendee, and in response to detecting that the sending meeting attendee is not within the current view of the meeting provided to the receiving meeting attendee by the augmented reality headset worn by the receiving meeting attendee, displaying the private message in a pop-up message display object within the current view of the meeting provided to the receiving meeting attendee by the augmented reality headset worn by the receiving meeting attendee, wherein the pop-up message includes both the private message and an identifier of the sending meeting attendee.

7. The method of claim 2, wherein performing the set of facial recognition operations includes retrieving a network address of the device associated with the receiving meeting attendee; and wherein automatically transmitting the private message from the augmented reality headset worn by the sending meeting attendee to the device associated with the receiving meeting attendee includes transmitting the private message to the network address of the device associated with the receiving meeting attendee.

8. The method of claim 1, further comprising:
displaying, by the augmented reality headset worn by the sending meeting attendee, within a current view of the meeting provided to the sending meeting attendee by the augmented reality headset worn by the sending meeting attendee, a display object associated with a group of meeting attendees;
wherein detecting selection of at least one receiving meeting attendee comprises detecting selection of the display object associated with the group of meeting attendees, wherein detecting selection of the display object associated with the group of meeting attendees includes detecting that the current direction of the sending attendee's gaze intersects with the display object associated with the group of meeting attendees; and
transmitting the private message from the augmented reality headset worn by the sending meeting attendee to each device associated with a respective one of the meeting attendees in the group of meeting attendees.

9. The method of claim 1, further comprising:
storing the invisible boundary boxes surrounding the three dimensional locations of the other meeting attendees as part of a polygonal mesh generated by the augmented reality headset to represent a real world of the meeting.

10. The method of claim 9, wherein the polygonal mesh generated by the augmented reality headset also represents at least one user interface display object that is overlaid on top of the real world.

11. A system for providing private real-time communication between meeting attendees during a meeting, comprising:
an augmented reality headset worn by a sending meeting attendee and including at least one processor and memory, wherein the augmented reality headset worn by the sending meeting attendee is configured to
calculate a three dimensional location of each one of the other meeting attendees,
generate an invisible boundary box surrounding each one of the three dimensional locations of each one of the other meeting attendees,
continuously monitor a current direction of the sending meeting attendee's gaze during the meeting,
automatically detect, responsive to monitoring of the current direction of the sending meeting attendee's gaze during the meeting, selection of at least one receiving meeting attendee from a plurality of meeting attendees other than the sending meeting attendee, wherein detecting selection of the receiving meeting attendee includes detecting that the current direction of the sending attendee's gaze intersects with a location of the receiving meeting attendee, wherein the augmented reality headset detects that the current direction of the sending meeting attendee's gaze intersects with the location of the receiving meeting attendee at least in part by detecting that the current direction of the sending meeting attendee's gaze intersects with an invisible boundary box that surrounds the three dimensional location of the receiving meeting attendee,
after selection of the receiving meeting attendee has been detected, and also responsive to monitoring of the current direction of the sending meeting attendee's gaze during the meeting, receive a messaging command issued by the sending meeting attendee, and
automatically transmit a private message from the augmented reality headset to a device associated with the receiving meeting attendee in response to receiving the messaging command.

12. The system of claim 11, wherein the augmented reality headset worn by the sending meeting attendee is further configured to:
capture a plurality of facial images via the augmented reality headset worn by the sending meeting attendee;
perform a set of facial recognition operations to associate an attendee identity with each one of the facial images captured via the augmented reality headset worn by the sending meeting attendee; and
in a current view of the meeting provided to the sending meeting attendee by the augmented reality headset worn by the sending meeting attendee, display each one of the attendee identities in close visual proximity to the associated facial image.

13. The system of claim 11, wherein the augmented reality headset worn by the sending meeting attendee receives the messaging command issued by the sending meeting attendee at least in part by detecting, as the messaging command, and also responsive to monitoring of the current direction of the sending meeting attendee's gaze during the meeting, that the direction of the meeting attendee's gaze has continuously intersected with the location of the receiving meeting attendee for at least a predefined amount of time; and
wherein the augmented reality headset worn by the sending meeting attendee is further configured to automatically transmit the private message to the device associated with the receiving meeting attendee at least in part by transmitting a default private message in response to detecting that the direction of the sending meeting attendee's gaze has continuously intersected with the location of the receiving meeting attendee for at least the predefined amount of time.

14. The system of claim 12, wherein the augmented reality headset worn by the sending meeting attendee receives the messaging command issued by the sending meeting attendee at least in part by i) displaying, to the sending meeting attendee, within the current view of the meeting provided to the sending meeting attendee by the augmented reality headset worn by the sending meeting attendee, a list of predefined messages, and ii) detecting, responsive to monitoring the current direction of the sending meeting attendee's gaze during the meeting, selection by the sending meeting attendee of a predefined message from within the list of predefined messages, by detecting that the current direction of the sending meeting attendee's gaze has intersected with the predefined message displayed within the list of the predefined messages; and
wherein the augmented reality headset worn by the sending meeting attendee is further configured to automatically transmit the private message to the device associated with the receiving meeting attendee at least in part by transmitting the predefined message selected by the sending meeting attendee from within the list of predefined messages to the device associated with the receiving meeting attendee.

15. The system of claim 14, further comprising:
an augmented reality headset worn by the receiving meeting attendee and having at least one processor and memory, wherein the device associated with the receiving meeting attendee comprises the augmented reality headset worn by the receiving meeting attendee, and wherein the augmented reality device worn by the receiving meeting attendee is configured to responsive to receipt of the private message, detect whether the sending meeting attendee is within a current view of the meeting provided to the receiving meeting attendee by the augmented reality headset worn by the receiving meeting attendee, and in response to detecting that the sending meeting attendee is within the current view of the meeting provided to the receiving meeting attendee by the augmented reality headset worn by the receiving meeting attendee, display the private message in close visual proximity to the sending meeting attendee within the current view of the meeting provided to the receiving meeting attendee by the augmented reality headset worn by the receiving meeting attendee.

16. The system of claim 14, further comprising:

an augmented reality headset worn by the receiving meeting attendee and having at least one processor and memory, wherein the device associated with the receiving meeting attendee comprises the augmented reality headset worn by the receiving meeting attendee, and wherein the augmented reality device worn by the receiving meeting attendee is configured to responsive to receipt of the private message, detect whether the sending meeting attendee is within a current view of the meeting provided to the receiving meeting attendee by the augmented reality headset worn by the receiving meeting attendee, and in response to detecting that the sending meeting attendee is not within the current view of the meeting provided to the receiving meeting attendee by the augmented reality headset worn by the receiving meeting attendee, display the private message in a pop-up message display object within the current view of the meeting provided to the receiving meeting attendee by the augmented reality headset worn by the receiving meeting attendee, wherein the pop-up message includes both the private message and an identifier of the sending meeting attendee.

17. The system of claim 12, wherein the augmented reality headset worn by the sending meeting attendee is further configured to perform the set of facial recognition operations at least in part by retrieving a network address of the device associated with the receiving meeting attendee; and wherein the augmented reality headset worn by the sending meeting attendee is further configured to automatically transmit the private message to the device associated with the receiving meeting attendee at least in part by transmitting the private message to the network address of the device associated with the receiving meeting attendee.

18. The system of claim 11, further comprising:

wherein the augmented reality headset worn by the sending meeting attendee is further configured to display, within a current view of the meeting provided to the sending meeting attendee by the augmented reality headset worn by the sending meeting attendee, a display object associated with a group of meeting attendees;

wherein the augmented reality headset worn by the sending meeting attendee is further configured to detect selection of at least one receiving meeting attendee at least in part by detecting selection of the display object associated with the group of meeting attendees, wherein detecting selection of the display object associated with the group of meeting attendees includes detecting that the current direction of the sending attendee's gaze intersects with the display object associated with the group of meeting attendees; and wherein the augmented reality headset worn by the sending meeting attendee is further configured to transmit the private message to each device associated with a respective one of the meeting attendees in the group of meeting attendees.

19. A computer program product having a non-transitory computer readable medium storing a set of instructions that when executed by a processor perform the steps of:

in an augmented reality headset worn by a sending meeting attendee calculating a three dimensional location of each one of other meeting attendees, generating an invisible boundary box surrounding each one of the three dimensional locations of each one of the other meeting attendees, continuously monitoring a current direction of the sending meeting attendee's gaze during the meeting, automatically detecting, responsive to monitoring of the current direction of the sending meeting attendee's gaze during the meeting, selection of at least one receiving meeting attendee from a plurality of meeting attendees other than the sending meeting attendee, wherein detecting selection of the receiving meeting attendee includes detecting that the current direction of the sending attendee's gaze intersects with a location of the receiving meeting attendee, wherein detecting that the current direction of the sending meeting attendee's gaze intersects with the location of the receiving meeting attendee includes detecting that the current direction of the sending meeting attendee's gaze intersects with an invisible boundary box that surrounds the three dimensional location of the receiving meeting attendee, after detecting selection of the receiving meeting attendee, and also responsive to monitoring of the current direction of the sending meeting attendee's gaze during the meeting, receiving a messaging command issued by the sending meeting attendee, and automatically transmitting a private message from the augmented reality headset worn by the sending meeting attendee to a device associated with the receiving meeting attendee in response to receiving the messaging command.

* * * * *